United States Patent
Torretta et al.

(10) Patent No.: US 12,388,758 B1
(45) Date of Patent: Aug. 12, 2025

(54) SCALABLE NETWORK TRAFFIC SHAPING SERVICE WITH DYNAMICALLY CONFIGURED PARTITIONS

(71) Applicant: Amazon Technologies, Inc., Seattle, WA (US)

(72) Inventors: Ethan Joseph Torretta, Edmonds, WA (US); Chaithan Mysore Prakash, Seattle, WA (US); Kirk Arlo Petersen, Nevada City, CA (US); Michael Weyandt, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 436 days.

(21) Appl. No.: 17/809,258

(22) Filed: Jun. 27, 2022

(51) Int. Cl.
*H04L 47/22* (2022.01)
*H04L 45/00* (2022.01)
*H04L 45/42* (2022.01)
*H04L 47/125* (2022.01)
*H04L 47/215* (2022.01)

(52) U.S. Cl.
CPC ............ *H04L 47/22* (2013.01); *H04L 45/42* (2013.01); *H04L 45/566* (2013.01); *H04L 47/125* (2013.01); *H04L 47/215* (2013.01)

(58) Field of Classification Search
CPC ..... H04L 45/42; H04L 45/566; H04L 47/125; H04L 47/215; H04L 47/22
See application file for complete search history.

(56) References Cited

U.S. PATENT DOCUMENTS

| | | | |
|---|---|---|---|
| 8,966,622 B2 | 2/2015 | Dickinson et al. | |
| 9,503,471 B2 | 11/2016 | McGloin et al. | |
| 9,552,550 B2 | 2/2017 | Vasseur et al. | |
| 9,577,937 B2 | 2/2017 | Vasseur et al. | |
| 9,712,390 B2 | 7/2017 | Lissack | |
| 10,002,011 B2 | 6/2018 | Lissack | |
| 10,218,631 B2 | 2/2019 | Mangin | |
| 10,587,638 B2 | 3/2020 | Mukerji et al. | |
| 10,630,719 B2 | 4/2020 | Jiang | |
| 11,102,238 B2 | 8/2021 | Ackerman et al. | |
| 2019/0042297 A1* | 2/2019 | Connor | H04L 43/20 |
| 2020/0084131 A1* | 3/2020 | Bisht | H04L 45/64 |
| 2021/0250301 A1* | 8/2021 | Francini | H04L 43/0811 |
| 2022/0124560 A1* | 4/2022 | Yeh | H04L 41/5025 |

* cited by examiner

*Primary Examiner* — Donald L Mills
(74) *Attorney, Agent, or Firm* — Robert C. Kowert; Kowert, Hood, Munyon, Rankin & Goetzel, P.C.

(57) ABSTRACT

Packets received at a routing intermediary and directed to a resource are transmitted to a data plane node of a partition of a traffic management service. The data plane node transmits an indication of a high-arrival-rate destination group, identified based on a metric of network packets received at the data plane node, to a control plane node of the service. A resource is identified at the control plane node as a rate limiting target based on high-arrival-rate group information from several data plane nodes. A limit is applied to the rate at which packets are received at the target. The control plane node changes the number of data plane nodes in the partition based on a triggering condition.

20 Claims, 9 Drawing Sheets

- DPN compute capacities 702
- Number and size range of data plane partitions 706
- Overload thresholds for triggering rate limiting 710
- Limits on packet flow rates 714 (e.g., implemented using token buckets)
- DPN-to-CPN mappings 718
- Smoothing factors for detecting actionable overload conditions 722
- Default duration for which flow rates are limited 726
- Quarantine criteria 730
- Flow categories to be shaped 734
- Partition overload handling policies 738
- High-arrival-rate destination group data collection frequencies 742
- CPN consensus algorithms 746
- Destination exclusion rules 750

SCALABLE NETWORK TRAFFIC SHAPING SERVICE WITH DYNAMICALLY CONFIGURED PARTITIONS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines. In scenarios in which thousands of virtual machines are implemented at a cloud provider's data centers, high network traffic rates of some of the virtual machines may potentially impact performance achievable at other virtual machines.

BRIEF DESCRIPTION OF DRAWINGS

FIG. 7 illustrates examples of parameters governing the processing of network traffic at a traffic shaping service, according to at least some embodiments.

Figure 1:
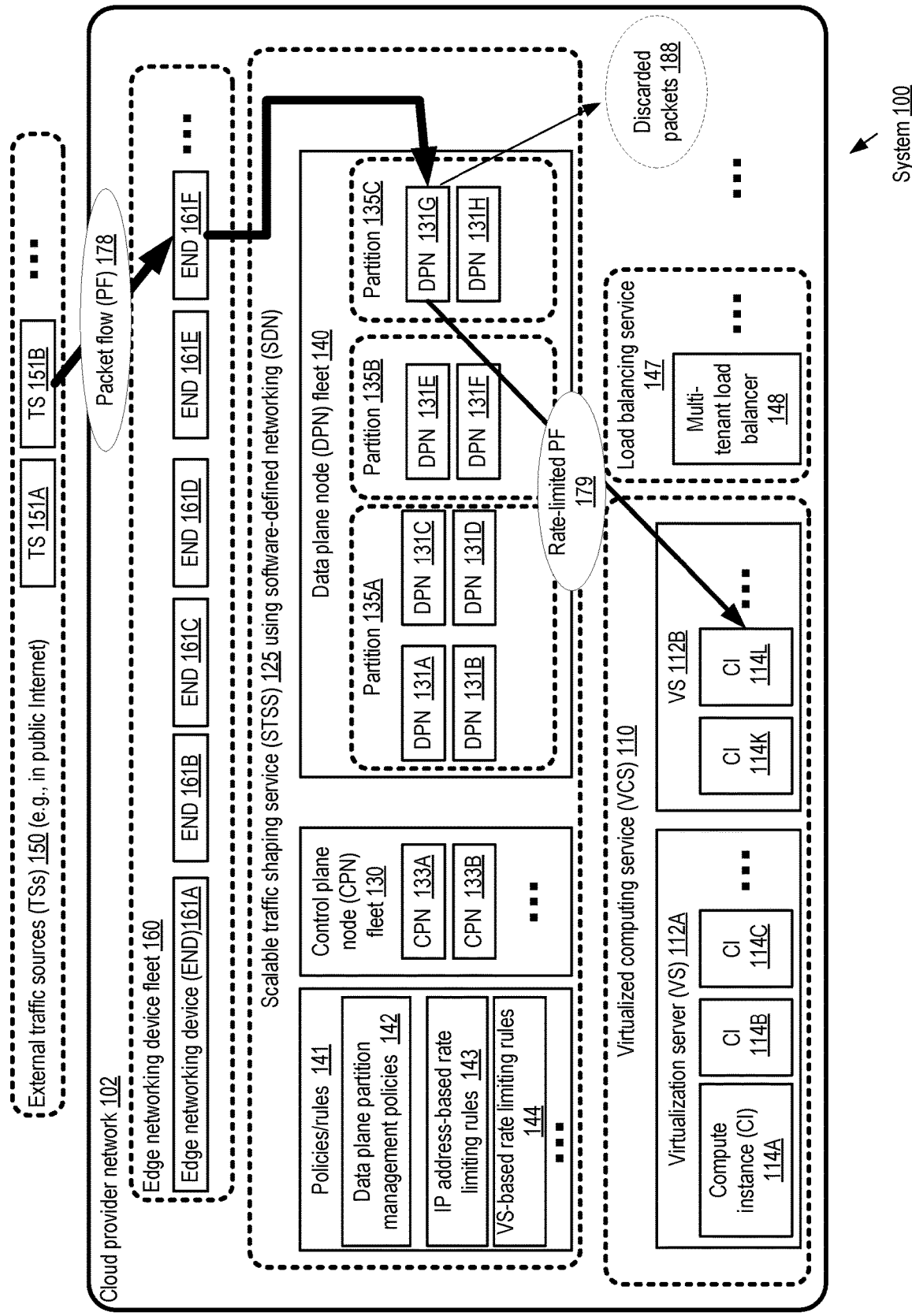
FIG. 1 illustrates an example system environment in which a scalable traffic shaping service may be implemented using software defined networking (SDN) techniques at a cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for limiting, using software defined networking (SDN) techniques implemented at a scalable traffic shaping service, the rates at which network traffic is directed to a set of destinations such as compute instances of a virtualized computing service within a cloud provider network. Limiting incoming traffic rates at intermediaries such as data plane nodes of the scalable traffic shaping service, before the traffic reaches the hardware devices such as virtualization servers used by the destinations, can help reduce the impact of network attacks (such as distributed denial-of-service (DDOS) attacks) not just for the attack targets but also for other networking destinations which may be sharing multi-tenant hardware resources with the attack targets. Rate limiting techniques implemented at the traffic shaping service can also mitigate impacts of unexpectedly high sustained rates of legitimate traffic, so their utility is not limited to handling network attacks.

A set of destinations whose traffic is to be managed in accordance with rate limiting policies is identified at the scalable traffic shaping service (STSS). A rate limiting policy can indicate the maximum rate (e.g., in raw packets per second, packet fragments per second, packets of a particular category per second or other similar units) at which network messages of one or more types are to be received at a specified group of one or more destinations. Such policies can be applied for example by intercepting flows of network messages and dropping a subset of the messages if needed. Different rate limiting policies or rules can be implemented for different types of messages or packets, and for different groups of destinations, and new rate limiting policies can be added dynamically (e.g., in response to detection of new kinds of network attacks, or in response to the configuration of additional destinations) to the collection of policies implemented by the STSS. In the remainder of this description, the term "packet" is used to refer to a collection of bytes representing a message of a flow of messages to which a rate limiting rule can be applied; note that in some cases, rate limiting rules can also or instead be applied by an STSS to sequences of fragments of packets (e.g., in scenarios in which a packet is fragmented due to maximum transmission unit or MTU restrictions). Applying rate limiting policies to a set of packet flows is also referred to as shaping the packet flows.

A fleet of data plane nodes (e.g., packet processing software programs) of the STSS, configured as the appliers of the rate limiting policies to various packet flows, is divided into dynamically scalable partitions, such that traffic directed to a given subset of destinations is processed by, and if needed rate-limited by, the nodes of a single partition. Such partitioning ensures that in the event of a failure or an introduction of a bug (e.g., caused by a faulty software update) at the nodes of a given partition, the impact or "blast radius" of the problem is limited to at most the subset of destinations for which the given partition was assigned, and also enables different partitions to be scaled up or down independently of each other as network traffic rates change or as other scaling criteria are met. As used in this document, the term "fleet" refers to a plurality of entities; as such, a fleet of data plane nodes includes a plurality of data plane nodes, a fleet of edge networking devices includes a plurality of edge networking devices, and so on.

Control plane nodes (e.g., nodes running administrative programs of the STSS) can assign data plane nodes (DPNs) to partitions, and partitions to subsets of the destinations. Control plane nodes (CPNs) can generate rate limiting parameter sets (RPSs), e.g., based on analysis performed at the CPNs of metrics of packet flows with high arrival rates reported by DPNs. Packet flows can be distinguished from one another based on a combination of header values, such as the networking protocol being used, the source network address, the destination network address, the source port, the destination port, etc. The RPSs can indicate which packet flows (if any) directed to a given destination are to be rate limited by a given DPN, and the rates to which such packet flows are to be limited. The destinations for which rate limits are to be applied by DPNs can be referred to as rate limiting targets or rate limiting candidates. The CPNs can transmit the RPSs indicating the rate limiting targets, e.g., in rate limiting commands, to the DPNs. Routing intermediaries such as edge networking devices of the provider network (which initially receive packets from sources external to the provider network that are directed to destinations within the provider network) can be provided metadata indicating the mappings of destinations to data plane partitions of the STSS by the CPNs, enabling the routing intermediaries to transmit received packets to selected data plane nodes of the appropriate partitions.

When such a packet is received at a DPN (e.g., in an encapsulation packet created at the routing intermediary), the DPN can determine whether an RPS (received earlier at the DPN from a CPN) is applicable to the flow to which the packet belongs. If the flow to which a packet belongs is to be rate limited, the data plane node applies the rate limit, e.g., by dropping the packet if needed. Some packets of a rate limited flow can be forwarded or sent on to their intended destinations (as long as the rate at which such packets are received at the destinations is below the limit being applied). DPNs can store flow logs locally indicating the received packets and the transmitted/forwarded packets. DPN components can extract and analyze metrics (e.g., raw packets directed to a destination per second over some number of seconds) from such flow logs to identify high-arrival-rate destinations or addresses, and provide the information about the high-arrival-rate destinations/addresses to CPNs iteratively (e.g., once every few seconds or once every few hundred milliseconds). The CPNs can analyze the high-arrival-rate data reported by various DPNs to generate and/or modify RPSs, and propagate updated RPSs to the DPNs if needed. In order to reduce the probability of applying rate limits to packet flows that happen to have only a short burst of temporally closely-arriving packets, the CPNs can analyze DPN high-arrival-rate reports received over a selected longer interval before they decide to include a given flow in the set of flows that are to be rate limited. CPNs can add DPNs to partitions based on analysis of the traffic being handled by the partitions, remove DPNS from partitions, reassign DPNs dynamically to different partitions, migrate destinations between partitions (i.e., change the partition assigned to process packets directed to a given set of destinations) as needed, and make other similar configuration changes. The logic implemented at the DPNs and the CPNs can be said to represent examples of policy-driven virtualized network functions, and the STSS thus represents an example of a network function virtualization service.

As one skilled in the art will appreciate in light of this disclosure, certain embodiments may be capable of achieving various advantages, including some or all of the following: (a) substantially reducing the probability that some types of network attacks, including large-scale DDOS attacks from hundreds or thousands of attack sources, impairs application performance at the attacked resources such as compute instances implemented at a provider network, (b) substantially reducing the probability that such network attacks impair application performance at resources that are not the targets of the attack, but happen to be sharing physical resources such as virtualization servers or network links with the attacked resources, (c) protecting provider network resources from being overwhelmed by high rates of traffic from legitimate traffic sources, and/or (d) reducing, by dynamically reconfiguring the set of nodes which apply rate limiting rules as needed, the amount of computing and other resources required to enforce rate limiting policies for network traffic, relative to approaches in which dedicated special-purpose networking hardware devices are used for such purposes.

According to some embodiments, a system may include one or more control plane nodes (CPNs) of a scalable traffic shaping service (STSS) (also referred to as a traffic management service) of a cloud provider network, a fleet of data plane nodes (DPNs) of the STSS, and a fleet of edge networking devices (ENDs) of the cloud provider network. The DPN fleet may be divided into a plurality of partitions including a first partition and a second partition, such that DPNs of the first partition are responsible for processing traffic directed to a different set of destinations than the DPNs of the second partition. An END may be configured to cause one or more network packets that are received at the END to be transmitted to a particular DPN of the first partition. The packets may have been received at the END from the public Internet and may have a destination network address within a set of destination network addresses to which the first partition has been assigned for traffic processing.

The particular DPN to which the END transmits the packets may apply, based at least in part on a rate limit parameter set (RPS) provided by a CPN, a limit on a rate at which network packets with a particular destination network address are delivered to a compute instance to which the particular destination network address is assigned. For example, to apply the limit in a scenario in which the packets received from the END have a destination network address indicated as a rate limiting target in an RPS, the DPN may drop some fraction of the packets instead of forwarding/transmitting them to the destination network address. The DPN may, in various embodiments, transmit an indication of a high-arrival-rate address group identified at the DPN to one or more CPNs. The high-arrival-rate address group may, for example, be identified by the DPN based at least in part on a metric of network packets received at the DPN from a plurality of ENDs. Such metrics, which may be extracted from local flow logs maintained by the DPN, may include, among others, the raw rates at which packets directed to various destination network addresses have been received at the DPN over a selected recent time interval, the rate at which packets of a particular class or type (such as SYN packets requesting establishment of a Transmission Control Protocol (TCP) connection, ICMP (Internet Control Message Protocol) packets, HTTP (HyperText Transfer Protocol) packets etc.) directed to the destinations have been received, and so on.

In various embodiments, a CPN may identify one or more destination network addresses as rate limiting targets or rate limiting candidates based at least in part on (a) respective indications of high-arrival-rate address groups received at the CPN from a plurality of DPNs including the particular DPN and/or (b) a set of traffic management rules or policies of the STSS. The CPN may transmit a rate limiting parameter set (RPS) indicating the rate limiting targets/candidates (and/or other parameters such as the specific limits to be applied) to one or more DPNs in one or more partitions in some embodiments. The CPN may also monitor metrics collected from various partitions of DPNs, and modify membership (e.g., by adding or removing DPNs) of various partitions dynamically as needed in at least one embodiment, e.g., based on determining from the metrics that one or more partition configuration change triggering criteria have been satisfied. The metrics regarding partition configuration analyzed by the CPN may include, for example, the average number of packets (or packet flows) processed per DPN of a given partition during a given time interval, the CPU and memory utilizations of the servers being used for the DPNs, and so on. In some cases, the CPN may make partition configuration changes (such as migrating responsibility for some set of destinations from one partition to another, or adding/removing DPNs from some partitions) based at least partly on detecting sustained imbalances among the workloads of different partitions.

In some embodiments, at least some of the DPNs and/or CPNs may comprise SDN programs or applications executed at compute instances of a virtualized computing service (VCS) of the provider network. In various embodiments, the set of destinations whose inbound network traffic is shaped by the STSS may include several types of logical/virtual resources and/or physical resources located within, or managed by, the provider network, and may not be limited to compute instances of a VCS. For example, traffic directed to load balancers, virtualization servers used for compute instances (as distinct from traffic directed to individual compute instances running at such servers), or virtualized storage servers of the provider network may be rate limited in one embodiment. In some embodiments, virtual resources (such as compute instances or load balancers) that are run at hardware devices configured in multi-tenant mode may be selected as destinations whose inbound traffic is to be shaped. For example, in such embodiments, a CPN may include, in a list of network addresses whose inbound traffic arrival rates is to be analyzed for potential rate limiting, a network address which the CPN determines is assigned to a virtual resource which is implemented on a multi-tenant hardware device (a hardware device potentially used for resources of several different clients of the provider network). In contrast, in some such embodiments, a network address assigned to a virtual resource which runs on a single-tenant hardware device may be excluded by a CPN from a list of network addresses whose packet arrival rates are not to be analyzed for potential rate limiting. In some embodiments, the STSS may be used to shape traffic directed to resources external to the provider network, such as VCS-managed compute instances or VCS-managed physical servers located at data centers of clients of the provider network. The set of traffic management rules used to identify candidate destinations whose traffic is to be limited may include, for example, rules for identifying network attacks such as DDOS attacks, and/or rules for identifying network capacity overload events.

In some embodiments, a CPN may initially construct or populate the partitions of DPNs, choosing which partition (or partitions) are to be used for a given set of network destinations, and using estimates of the packet processing capacities of the DPNs and the estimated normal arrival rates of packets to the destinations to decide when a sufficient number of destinations has been assigned to a given partition. A CPN may assign respective partitions to respective sets of destination resources or destination network addresses, and programmatically notify intermediary routing devices such as edge networking devices of the mappings between destinations and partitions, enabling the intermediary routing devices to divert incoming packets to the DPNs of the appropriate partitions. In at least one embodiment, the intermediary devices may also be provided algorithms (e.g., hashing based algorithms whose input is a set of packet header contents) to select a specific DPN within a given partition as the DPN to be used for a given packet received at the intermediary devices.

In at least one embodiment, compute instances and other resources of a VCS may be organized as a collection of isolated virtual networks (IVNs), also referred to as virtual private clouds, virtual private networks, or virtual cloud network. An IVN is a custom-defined virtual network within another network, such as a cloud provider network. An IVN can provide a foundational network layer for a cloud service, for example a compute cloud or an edge cloud, or for a customer application or workload that runs on the cloud. An IVN can be defined by at least its address space, internal structure (e.g., the computing resources that comprise the IVN), security rules or security groups used for determining whether inbound or outbound traffic is permitted with respect to resources external to the IVN, and transit paths. An IVN can be dedicated to a particular customer account (or set of related customer accounts, such as different customer accounts belonging to the same business organization). An IVN is logically isolated from other virtual networks in the cloud. VCS clients can launch resources, such as compute instances, into their IVN. Customers can have substantial flexibility with respect to the networking configuration details within their IVNs, such as choosing Internet Protocol (IP) addresses, configuring subnets and so on. In some embodiments, when assigning partitions to groups of destinations, a CPN of the STSS may attempt to assign destinations within a given IVN to a single partition if possible, e.g., instead of distributing the destinations of a given IVN across multiple partitions. Assigning destinations such as compute instances of a given IVN to a single partition may also help reduce the impact of errors/failures at the partitions. Of course, in some cases, the number of compute instances or other destinations within a given IVN, or the cumulative rate of expected or nominal inbound traffic to a given IVN, may be too high to handle the traffic of the entire IVN at a single partition; in such cases, the destinations of the IVN may be split across multiple partitions.

In some embodiments, multiple CPNs of the STSS may collaborate with one another, e.g., to make decisions regarding rate limiting targets. For example, in one embodiment, high-arrival-rate destination information may be transmitted from a given DPN to multiple CPNs, and a given CPN may receive high-arrival-rate from multiple DPNs. In such an embodiment, each CPN may analyze a respective set of data collected from multiple DPNs and identify respective sets of candidates for rate limiting. The CPNs may then exchange their candidate lists via messages directed to each other, and arrive at a consensus before sending rate limiting parameter sets for implementation to the DPNs. A time series of high-arrival-rate destination information from any given DPN may be analyzed (e.g., respective reports R1, R2, R3, R4 and R5 received during the previous N seconds from a DON) at a CPN before identifying candidates for rate limiting, so that short-term spikes in traffic do not significantly impact the selection of the candidates for rate limiting.

A token buckets based algorithm may be employed for rate limiting by the DPNs in some embodiments. For any given destination, a data structure representing a token bucket may be populated with some number of tokens, e.g., when the first packet of a flow directed to the destination is encountered at a DPN, with new tokens being added periodically at a parameterized bucket refresh rate. A packet may only be forwarded or transmitted to its intended destination address if at least one token remains in the corresponding bucket, and one token may be deducted from the bucket for each such forwarded packet. When a packet is received at the DPN and the token bucket maintained for the destination of the packet does not happen to have any tokens remaining in it, the DPN may drop the packet in various embodiments. The parameters of the bucket (e.g., the initial number of tokens, how frequently the tokens are refreshed, the number of tokens added each time the bucket is refreshed, etc.) may be adjusted based on the rate limit to be applied for the destination by the DPN. When a packet is received at the DPN and the token bucket maintained for the destination of the packet does not have any tokens remaining in it, the DPN may drop the packet in various embodiments.

In various embodiments, the traffic shaping performed by an STSS may be transparent to the packet destinations, at least with respect to packets that are not dropped as a result of applying rate limiting policies. For example, the edge networking devices and/or the DPNs may use encapsulation and decapsulation algorithms to make it appear that a packet P1, which originated at a traffic source TS1 and was processed by an edge networking device or other intermediary as well as a DPN before being received at a traffic destination TD1, was transmitted directly from TS1 to TD1. Even with respect to packets that are dropped by the DPNs in accordance with rate limiting policies, in at least some embodiments the reason for the absence of some packets from a flow may not necessarily be provided to the network destinations.

In some cases in which a traffic destination TD1 is being attacked by sending a high-arrival-rate flow of packets, the overall traffic being directed to TD1 may comprise a mix of attack packets (packets that are sent specifically to bring down applications being run using TD1) and legitimate packets (packets that are sent from sources which are not participating in the attack, but are simply communicating with the applications being run using TD1). In at least one embodiment, the CPNs (and/or DPNs) may be able to distinguish the attack traffic packets from the legitimate packets (e.g., based on per-flow analysis of the traffic being sent to TD1), and the attack packets may be dropped instead of the legitimate packets to the extent possible.

In some embodiments, some DPNS of an STSS may be placed (e.g., by CPNs) in general-purpose partitions, while other DPNs may be placed in special-purpose partitions. The DPNs of general-purpose partitions may be used for processing traffic of most destinations of the set of destinations whose traffic is being shaped, while the DPNs of special-purpose partitions may be used for handling special cases such as destinations that have been identified as probable targets for DDOS attacks, for testing new rate limiting related algorithms, and so on.

As indicated above, the STSS may be implemented as part of a suite of services of a cloud provider network or cloud computing environment in various embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. The edge networking devices described herein may be located at such TCs. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, the resources whose inbound traffic is shaped with the help of an STSS may be located within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Some edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to an STSS and a VCS, data processing service(s) (e.g., map reduce, data flow, and/or other large scale data processing techniques), data storage services (e.g., object storage services, block-based storage services, or data warehouse storage services), other kinds of packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service or VCS (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network including the STSS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a scalable traffic shaping service may be implemented using software defined networking (SDN) techniques at a cloud provider network, according to at least some embodiments. As shown, system 100 comprises resources and artifacts of scalable traffic shaping service (STSS) 125, a virtualized computing service (VCS) 110, a load balancing service 140, and an edge networking device fleet 160 of a cloud provider network 102. The cloud provider network may include additional services not shown in FIG. 1, such as database management services, machine learning services, and so on. The STSS 125 may be implemented using software defined networking (SDN); for example, packet processing programs or virtualized network functions may be run at hosts/servers used for data plane nodes (DPNs) and/or control plane nodes (CPNs) of the STSS. The STSS may also be referred to as a traffic management service or a network management service in some embodiments.

The STSS may be responsible for shaping or more generally managing at least inbound flows of network traffic which originate at a set of external traffic sources (TSs) 150 and are directed to set of destinations that includes compute instances (CIs) run at virtualization servers (VSs) of the VCS 110. For example, VS 112A may comprise CI 114A, 114B and 114C, while VS 112B may comprise CIs 114K and 114L. The CIs at a given VS may be launched on behalf of different VCS clients in some cases—that is, the VSs may be configured in multi-tenant mode in at least some embodiments, with virtual resources such as CIs of different clients sharing hardware resources. Each CI 114 may be assigned one or more IP addresses (using virtual network interfaces as discussed below), which can include IP addresses accessible from or advertised within the public Internet, as well as IP addresses which are only advertised or known within the VCS. The addresses accessible from the public Internet may be referred to as public IP addresses, while the addresses known only within the VCS may be referred to as private IP addresses. External traffic sources such as TS 151A or TS 151B may send packets to public IP addresses of CIs via edge networking devices 161 (such as ENDs 161A, 161B, 161C, 161D, 161E or 161F), and the flows of such packets may be among those that are analyzed at the STSS for potential rate limiting. Edge networking device fleet 160 may comprise hundreds or thousands of ENDs 161 in some embodiments, and traffic directed to a CI or a load balancer may be received at any one of the ENDs from an external traffic source. As such, the END fleet itself may not be well suited to implementing rate limiting, as collaboration among hundreds or thousands of ENDs may potentially be required to rate limit the packet flows directed to any given destination resource within the provider network. In at least some embodiments, packet flows originating within the VCS itself may also be analyzed for rate limiting by the STSS; that is, rate limiting policies may be applied not just for packet flows originating at sources external to provider network 102.

The STSS may implement a set of traffic management policies/rules 141, which may include IP address-based rate limiting rules 143, VS-based rate limiting rules 144, and/or rules for limiting the rates at which inbound packets are received at other resources implemented at the provider network 102, such as multi-tenant load balancers 148 of the load balancing service 147. A given rate limiting rule may specify, for example, the conditions or criteria for detecting actionable network overload scenarios comprising packet flows with cumulative high arrival rates (the overload scenarios may result from an attack, legitimate packet flows, or a combination of attack(s) and/or legitimate traffic), the maximum rate at which packets of one or more categories should be allowed to be delivered to a specified group of destinations after such actionable scenarios are detected, how long the traffic rate should be limited in such circumstances, and so on. An IP-address based rate limiting rule may define actionable scenarios in terms of the traffic directed to a given IP address, while a VS-based rate limiting rule may take the cumulative amount of traffic being directed to the set of IP addresses assigned to compute instances on a given virtualization server into account when analyzing traffic for actionable overload scenarios. The rate limiting rules applied to one IP address (or one VS) may differ from the rate limiting rules applied to other IP addresses (or other VSs) in at least some embodiments. For example, some VSs may have greater computation power and networking bandwidth capacity than others, so higher rates of traffic may be handled without problems at such VSs than at less well-configured VSs. Other types of rate-limiting rules may be defined and applied by the STSS in some embodiments, in addition to or instead of IP address based rules or VS-based rules—for example, a different set of rate-limiting rules may be enforced for traffic directed to load balancers 142 than the rules used for compute instances or virtualization servers.

Rate limiting rules/policies may be implemented or applied by data plane nodes (DPNs) 131 of DPN fleet 140 in the depicted embodiment. The DPN fleet may be divided (e.g., by CPNs 133 such as CPN 133A or CPN 133B of CPN fleet 130) into dynamically configurable partitions 135, such as partitions 135A, 135B or 135C in the depicted embodiment. Each partition may comprise a number of DPNs—e.g., at the point of time depicted in FIG. 1, partition 135A comprises DPNs 131A, 131B, 131C and 131D, partition 135B comprises DPN 131E and 131F, while partition 135C includes DPN 131G and 131H. A given partition may be assigned to process (and if and when needed, limit the rate of) traffic directed to a respective set of destinations in the depicted embodiment. For example, if the set of destinations whose inbound traffic is to be analyzed for rate limiting comprises 1000 CIs 114, 500 CIs may be assigned partition 135A, 300 CIs may be assigned partition 135B, and the remaining CIs may be assigned partition 135C. The assignment of destinations to partitions may be performed by CPNs in some embodiments, and such assignments may not be static—that is, in at least some cases, a CPN may transition or migrate a set of destinations from one partition to another based at least on part on detecting that a workload migration criterion for the original partition has been met. A variety of workload migration criteria may be used in different embodiments—e.g., migration criteria based on the level of resource utilizations at a partition may be used, a notification that a software or hardware upgrade is to be performed at a partition may be used as a trigger for migrating workload, and so on. CPNs may in some embodiments assign DPNs to partitions, dynamically modify partition membership based on various factors such as analysis of metrics collected from the partitions, and/or make other configuration changes at partitions (e.g., replacing a given DPN with a DPN implemented at a computing device with greater computational power). The initial establishment of the partitions, as well as later modifications to the partitions, may be performed in accordance with a set of data plane partition management policies 142 of the STSS. Information about the mappings between partitions and destinations may be provided by the CPNs to ENDs in the depicted embodiment, enabling ENDs to direct packets received from external traffic sources to the partition assigned to process the packets.

The specific rate limits to be applied to individual packet flows or to all packets flowing to a given destination may be provided as parameters (referred to as rate limiting parameter sets or RPSs) to the DPNs by a CPN in the form of messages referred to as rate limiting commands or recommendations in some embodiments. The RPSs may be generated at the CPNs based on information collected from the DPNs in the depicted embodiment. For example, a given DPN may analyze local logs in which the arrival of packets of various flows are recorded, identify one or more destinations as high-arrival-rate destinations over a given time interval (or identify the top K destinations in order of arrival rates) based on the analysis of the local logs, and transmit the high-arrival-rate destination information to one or more CPNs. The CPNs in turn may aggregate and analyze the high-arrival-rate destination information obtained over some time period (e.g., in J successive high-arrival-rate reports) from various DPNs, and determine whether any actionable overload scenarios can be identified. If a CPN concludes that imposition of a rate limit is justified in view of the analysis, a parameter set for that rate limit may be constructed and sent to the appropriate DPNs in at least some embodiments.

In the example scenario depicted in FIG. 1, a packet flow (PF) 178 originating at TS 151B is directed to CI 114L of VCS 110 via END 161F. Based on the destination-to-partition mappings transmitted to END 161F from a CPN, END 161F determines that packets of PF 178 should be transmitted to partition 135C. Furthermore, based on a DPN selection algorithm (which may be hashing-based), END 161F is also able to determine that packets of PF 178 should be set to DPN 131G within partition 135C. Upon receiving a packet of PF 178, the DPN 131G may determine (e.g., by an efficient lookup indexed by the flow identifier or the destination identifier, into a table or data structure comprising rate limiting parameter sets sent earlier by a CPN) whether a rate limit is to be applied to the packets of the flow. If such a rate limit is found, some packets of PF 178 may be discarded (as indicated by discarded packets 188), while remaining packets of a now rate-limited packet flow 179 may be delivered to the intended destination CI 114L. Note that in at least some embodiments, encapsulation and/or decapsulation may be performed on the original packets of PF 178 (e.g., by END 161F, DPN 131G, virtualization management components within VS 112B, and/or other intermediary devices or components not shown in FIG. 1) before the rate-limited packets are delivered to the destination.

As indicated above, it may sometimes be the case that the overall set of packets sent to a destination such as a CI 114 comprises a subset of packets from attack sources (sources attempting a DDOS attack, for example), while other subsets of the packets may be from legitimate sources rather than attackers. In at least some embodiments, the sources from which the packets originate may be used to select the subset of packets to be dropped for rate limiting—e.g., packets from a source that has been identified at the CPNs as an attacker may be dropped preferentially by DPNs, while packets from sources identified as legitimate (or at least not identified as attackers) may be forwarded to their intended destination.

In some embodiments, one or more CPNs 133 may be responsible for automatically selecting various tunable parameters of the STSS over time (such as some of the parameters discussed below in the context of FIG. 7) and automatically tuning the parameters over time based for example on analysis of traffic patterns. In one embodiment, such automated tuning may be performed using machine learning models/algorithms to which time series of data associated with the rate limiting decisions made using the parameters is provided as input.

Figure 2:
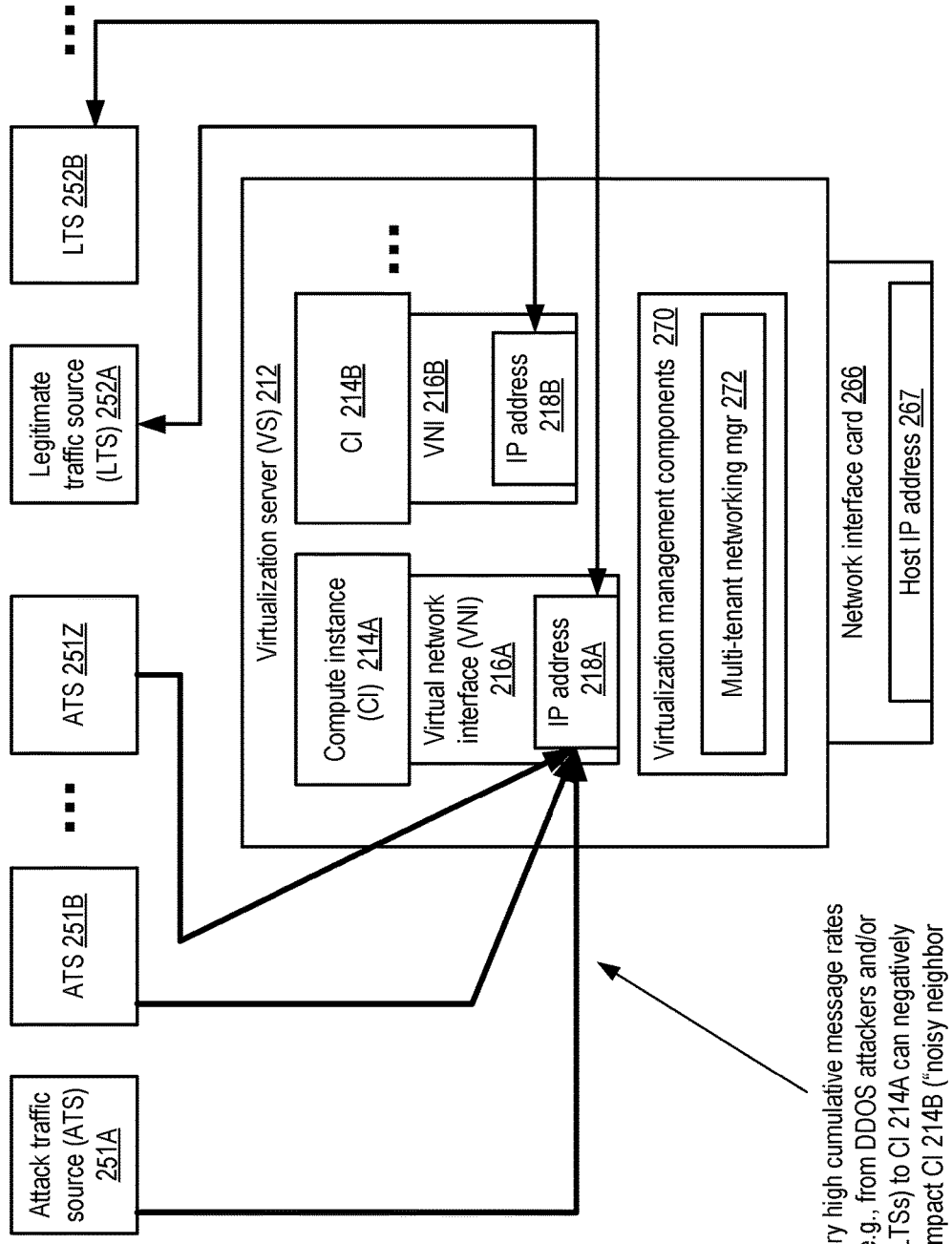
FIG. 2 illustrates an example scenario in which high incoming traffic rates at a compute instance of a virtualized computing service may impact performance achieved at another compute instance running at the same virtualization server, according to at least some embodiments.

FIG. 2 illustrates an example scenario in which high incoming traffic rates at a compute instance of a virtualized computing service may impact performance achieved at another compute instance running at the same virtualization server, according to at least some embodiments. In the example scenario shown in FIG. 2, virtualization server 212 may host at least two compute instances (CIs) 214A and 214B of a virtualized computing service (VCS) of a provider network. The two CIs may have been launched on behalf of different VCS clients in some cases; as such, the VS may be said to be configured in multi-tenant mode. The VS 212 may have a physical network interface card (NIC) 266 with a host IP address 267, referred to as the VS's substrate address or physical IP address. The VSs of the VCS may be attached to a physical network, referred to as a substrate network, using their respective NICs in various embodiments, and a virtualized network referred to as an overlay network may be configured on top of the substrate network.

Each of the CIs 214A and 214B may have a respective virtual network interface (VNI) 216 programmatically attached to the CI—e.g., VNI 216A may be programmatically attached to CI 214A, while VNI 216B may be programmatically attached to CI 214B. A VNI is a logical construct, part of the virtualized or overlay network, which enables various networking properties to be set programmatically for the CI to which the VNI is attached. At least some of the networking properties of a VNI, which may include one or more IP addresses (such as IP address 218A of VNI 216A or IP address 218B of VNI 216B), do not depend on the physical NIC of the host at which the CI happens to be running, and can be transferred easily from one CI to another by programmatically detaching the VNI from one CI and programmatically attaching the VNI to another CI. In some embodiments, the properties of a given VNI may include some number of private IP version 4 (IPv4) addresses, private IP version 6 (IPv6) addresses, public IP v4 addresses, public IPv6 addresses, subnet identifiers, security rules (also referred to as security groups) governing the types of incoming/outgoing traffic allowed, and so on. VNIs may also be referred to as elastic network interfaces or ENIs.

A traffic source external to the VS 212 may specify an IP address (e.g., a public IP address advertised and visible in the public Internet) of a VNI attached to a CI 214 as a destination IP address in the header of a packet in some embodiments. In order to transmit the packet to the right VS, substrate network management components of the VCS may create encapsulation packets within which the original packets are incorporated, with the encapsulation packets' destination IP addresses being set to the host IP address of VS 212. At the VS 212, a multi-tenant networking manager 272 of a virtualization management component 270 may perform decapsulation of the received encapsulation packet, extract the original packet and deliver it to the appropriate CI 214. The virtualization management components 270 may, for example, include a hypervisor and/or virtualization software run on offloader cards (e.g., hardware cards linked via peripheral interconnects to the primary processors of the VS) in different embodiments. The VS's multi-tenant networking manager 272 may also be responsible for ensuring that networking service level agreements (SLAs) for the CIs 214 are satisfied, and as such may potentially perform some types of rate limiting itself in some implementations (e.g., even in embodiments in which an STSS similar to STSS 125 of FIG. 1 is employed to perform rate limiting at a layer removed from the VSs).

In the scenario shown in FIG. 2, CI 214A is being sent packets from attack traffic sources (ATSs) 251A, 251B, . . . , ATS 251Z, and also from a legitimate traffic source (LTS) 252B. There may be hundreds or thousands of attack traffic sources in a large-scale distributed denial of service attack targeting CI 214A, for example. CI 214B is not being attacked, but is exchanging packets with LTS 252A. If the cumulative rates of messages directed to CI 214A is very high (e.g., from DDOS attackers and/or LTSs), the MS multi-tenant networking manager 272 may be overwhelmed handling only the messages directed to CI 214A, and may not be able to devote sufficient resources (e.g., CPU cycles or cycles of offloading processors) to messages of the legitimate traffic directed to CI 214B. As such, the performance achievable for applications running on CI 214B may be negatively impacted by the traffic directed to CI 214A. This type of interference may be referred to as the "noisy neighbor problem" in some embodiments (with CIs with high traffic arrival rates, such as CI 214A being considered the analogs of noisy neighbors of CIs with lower traffic arrival rates such as CI 214B). An STSS similar in features and functionality to STSS 125 of FIG. 1 may be employed in at least some embodiments to try to avoid scenarios such as the scenario shown in FIG. 1, in which traffic directed to one CI can impact the performance achieved at other CIs. By performing rate limiting at a separate set of STSS data plane nodes, CIs such as CI 214B may be protected or shielded from noisy neighbors in various embodiments; furthermore, in scenarios in which the high traffic arrival rates are due to packets sent by attack traffic sources, the STSS may also mitigate the impact of such attacks on the attacked targets. As mentioned earlier, an STSS may perform rate limiting not just for compute instances but also for other traffic destinations or resources such as load balancers in some embodiments.

Figure 3:
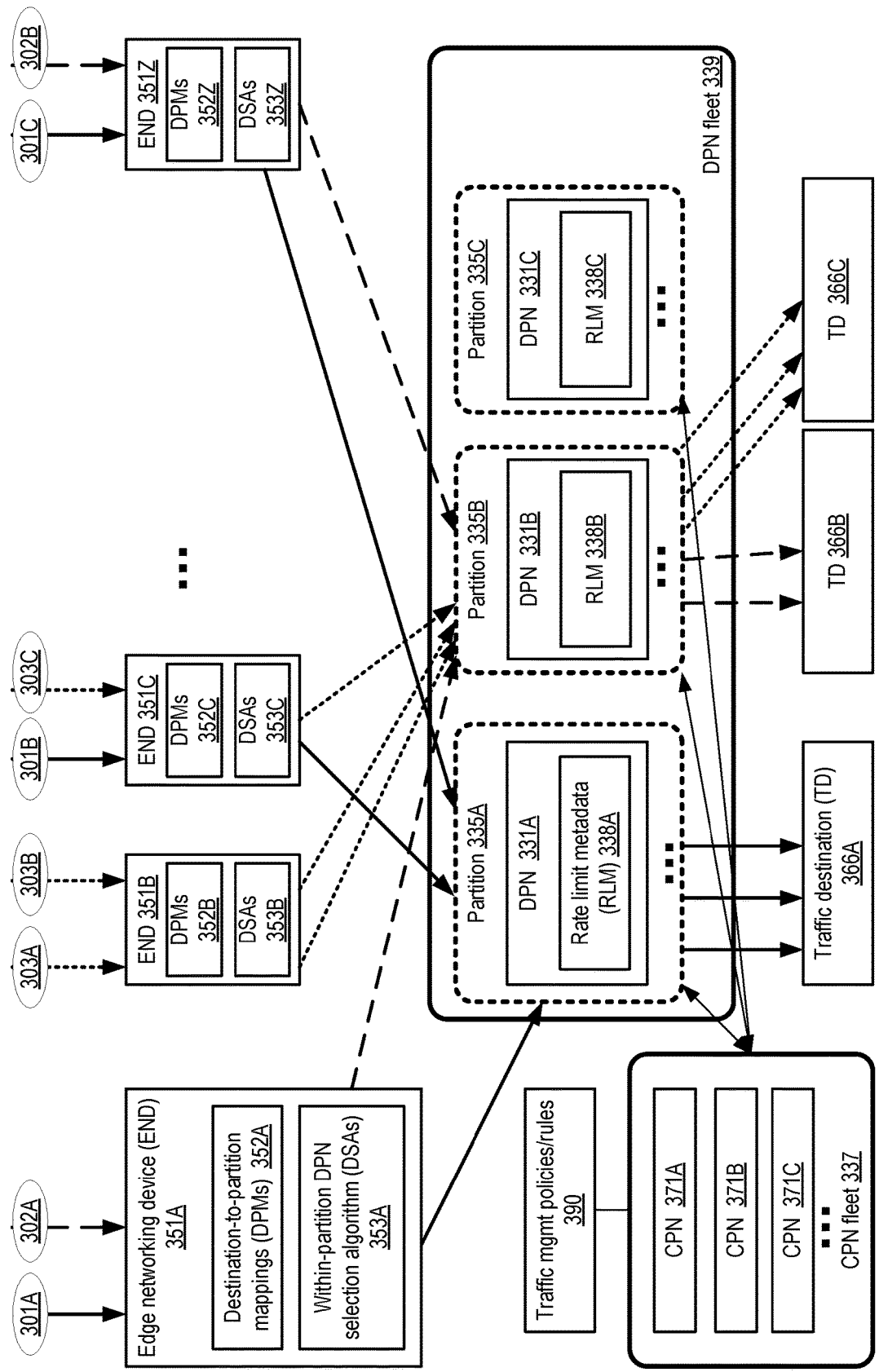
FIG. 3 illustrates an example of the assignment of data plane partitions of a traffic shaping service to process traffic of respective sets of traffic destinations, according to at least some embodiments.

FIG. 3 illustrates an example of the assignment of data plane partitions of a traffic shaping service to process traffic of respective sets of traffic destinations, according to at least some embodiments. In the scenario depicted in FIG. 3, three example traffic destinations (TDs) are shown by way of example: TDs 366A, 366B and 366C. A given TD may, for example, comprise a respective compute instance of a VCS, or a logical load balancer. The control plane node (CPN) fleet 337 of an STSS similar to STSS 125 of FIG. 1 includes CPNs 371A, 371B and 371C. The data plane nodes (DPNs) of a DPN fleet 339 of the STSS may be divided into partitions (e.g., by one or more CPNs 371 in accordance with traffic management policies/rules 390 of the STSS), such as partitions 335A, 335B and 335C. Partition 335A comprises one or more DPNs including DPN 331A, partition 335B includes one or more DPNs including DPN 331B, and partition 335C includes one or more DPNs including DPN 331C. A given partition 335 may be assigned by a CPN to process incoming traffic (and take rate-limiting actions, if needed) for a respective set of TDs in the depicted embodiment—for example, partition 335A is assigned to process traffic of at least TD 366A, while partition 335B is assigned to process traffic directed to at least TD 366B and 366C. In at least some cases, flows directed at different destinations to which a partition 355 has been assigned may be processed at respective DPNs of the partition. Flows for a given destination may be received at different ENDs and transmitted from all those ENDs to the same DPN within the same partition in the depicted embodiment.

The provider network at which the STSS is implemented may include a large fleet of edge networking devices (ENDs), including END 351A, 351B, 351C and 351Z. In some embodiments, the END fleet may comprise thousands of ENDs distributed around the world. Any given END may receive packets (e.g., from nearby traffic sources external to the provider network) directed to any given traffic destination within the provider network in some embodiments. In the depicted scenario, flows of packets from sources labeled 301A, 301B and 301C are directed to TD 366A and received initially at END 351A, END 351C and END 351Z respectively. Packet flows from sources labeled 302A and 302B are received initially at ENDs 351A and 351Z respectively, and are directed to TD 366B. Packet flows from sources labeled 303A, 303B and 303C are received initially at ENDs 351B, 351B and 351C respectively, and are directed to TD 366B.

Each DPN may maintain a set of flow logs in which the set of packets received at the DPN from various ENDs 351 are recorded, and may also store records of other data pertinent to rate limiting such as the packet flows to which rate limits recommended by the CPNs are currently being applied. The CPN fleet 337 may transmit destination-to-partition-mappings (DPMs) 352 to the ENDs in the depicted embodiment, informing the ENDs which partition 335 is to be used to process packets directed to any given TD 366. In addition, the CPN fleet may also provide within-partition DPM selection algorithms (DSAs) 353 to the ENDs, enabling an END to choose a specific DPM to which a given packet received from a source 301-303 is to be sent within the assigned partition. In some cases, a DSA may allow an END to choose any of several DPNs within a partition for a given packet. In one embodiment, a DSA may enable an END to identify a primary DPN and one or more non-primary DPNs in the assigned partition for packets of a given flow, such that packets of that flow can be sent to a non-primary DPN if the primary is inaccessible or non-responsive. In the depicted embodiment, END 351A is provided DPMs 352A and DSAs 353A, END 351B is provided DPMs 352B and DSAs 353B, END 351C is provided DPMs 352C and DSAs 353C, and END 351Z is provided DPMs 352Z and DSAs 353Z. In some implementations, the DPMs may be replicated at each of the ENDs, and the same DSAs may be employed at each of the ENDs. Using the DPMs and DSAs, packets from sources 301A, 301B and 301C are transmitted (e.g., using an encapsulation protocol) to DPN 331A of partition 335A by the ENDs, packets from sources 302A and 302B are sent to DPN 331B of partition 335B, and packets from sources 303A, 303B and 303C are sent to DPN 331B of partition 335B. DPN 331C of partition 335C may be used for packets of TDs not shown in FIG. 3.

Each of the DPNs in the partitions 335 may examine their respective flow logs, identify high-arrival-rate destinations (i.e., destinations for which that DPN received the most packets, or packets whose numbers exceeded a selected threshold count) over some recent time interval based on the entries in the flow logs. The DPN may then transmit an indication of some number of high-arrival-rate destinations (e.g., the top K destinations with the highest arrival rate over the last T milliseconds, identified from the local flow log of the DPN) to one or more CPNs 371. The CPNs 371 may use the high-arrival-rate data collected from one or more DPNs over some number of time intervals (e.g., based on time series of the last N high-arrival-rate destination reports from each DPN) to prepare a set of rate limiting parameters to be applied at the DPNs in accordance with the traffic management policies/rules 390. The CPNs may then transmit respective rate limiting parameter sets to the DPNs, where the parameter sets may be stored in a local collection of rate limiting metadata (RLM) 338, such as RLM 338, RLM 338B or RLM 338C. The parameters supplied by the CPNs may be applied to the packet flows received at the DPNs, resulting (in some cases) in some of the packets of a given flow being dropped, while remaining packets of the flow are sent on to the TDs for which they were originally directed by the traffic sources 301-303.

CPNs 371 may also analyze various partition metrics (including for example CPU utilizations at compute instances or physical servers being used for the DPNs, memory utilizations, network utilizations, imbalances in such metrics between different partitions, etc.) and/or be notified of events such as planned maintenance events at the partitions (including for example updates/upgrades to software/hardware), the addition of new TDs to the set of TDs for which traffic is to be shaped, or the removal/decommissioning of such TDs in various embodiments. Based on the analysis of such metrics and notifications, the CPNs may dynamically change partition configurations (including the number of DPNs included, the types of computing resources used for the DPNs, the mappings between TDs and partitions, etc.) in at least some embodiments.

Figure 4:
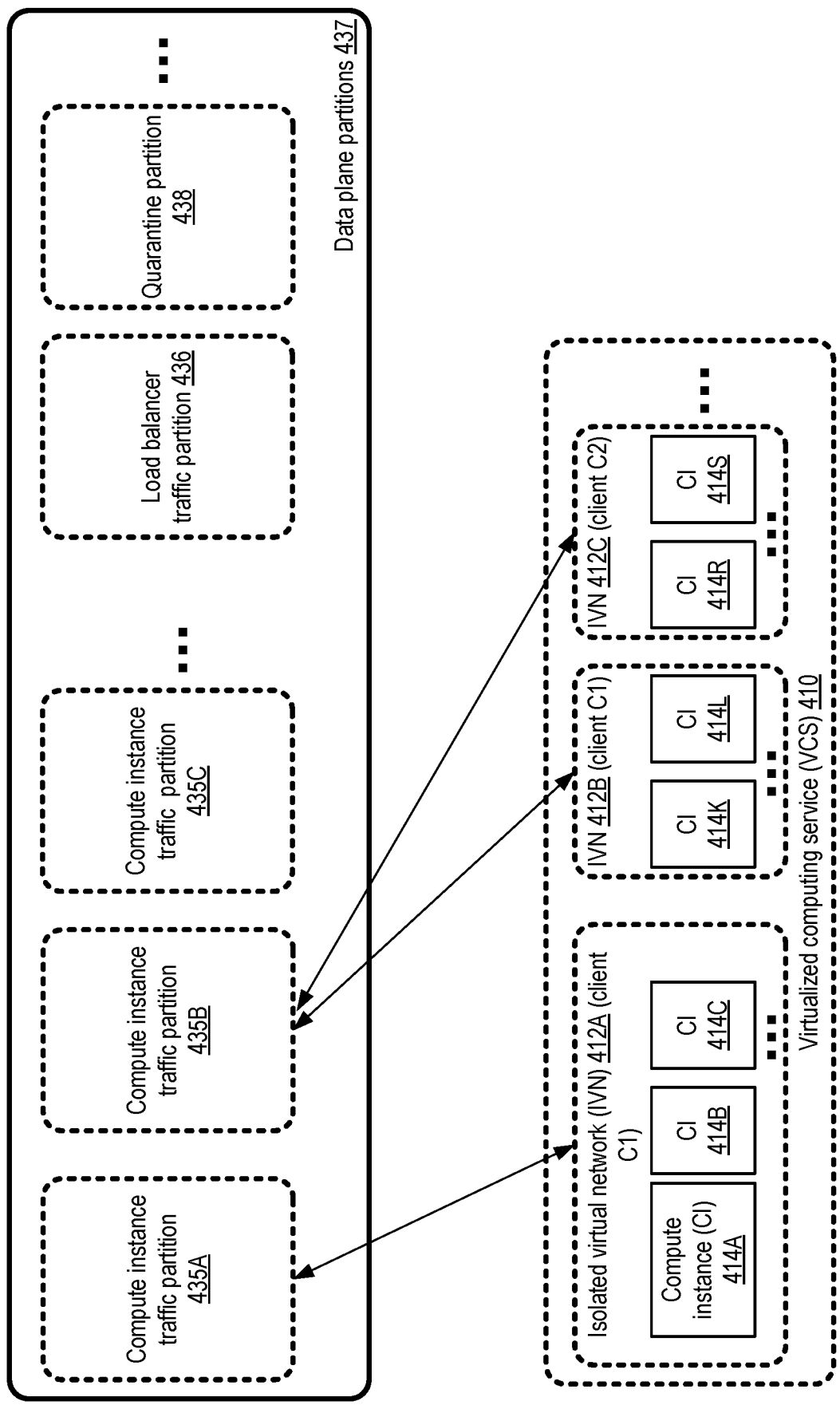
FIG. 4 illustrates example categories of data plane partitions of a traffic shaping service, according to at least some embodiments.

In some embodiments, several different types of data plane partitions may be established at an STSS. FIG. 4 illustrates example categories of data plane partitions of a traffic shaping service, according to at least some embodiments. In some embodiments, one set of partitions may be set up for managing/shaping inbound traffic of compute instances (CIs) of a VCS, other partitions may be established for managing/shaping inbound traffic of resources at other services of the provider network, while yet other partitions may be set up for special purposes such as quarantining destinations to which network attacks have been directed, testing new algorithms pertaining to rate limiting, and so on.

Data plane partitions 437 may include compute instance traffic partitions 435A, 435B and 435C, a load balancer traffic partition 436 and a quarantine partition 438 in the depicted embodiment. The VCS 410 may be organized as a collection of isolated virtual networks (IVNs) set up on behalf of VCS, with each IVN comprising some number of CIs. For example, IVN 412A set up for client C1 may include CIs 414A, 414B and 414C, IVN 412B (also set up for C1) may include CIs 414K and 414L, while IVN 412C established for a different client C2 may include CIs 414R and 414S. A given client such as C1 may create several different IVNs, for example with each of the IVNs being used for some related set of applications. In some embodiments, as mentioned above, when assigning data plane partitions to groups of destinations, a CPN of the STSS may attempt to assign destinations within a given IVN to a single partition as far as possible, e.g., instead of distributing the destinations of a given IVN across multiple partitions. Assigning destinations such as compute instances of a given IVN to a single partition may, for example, help reduce the impact of errors/failures at any given partition, as such failures/errors may not impact any IVNs whose traffic is being managed by other partitions. Of course, in some cases, the number of compute instances or other destinations within a given IVN, or the cumulative rate of expected or nominal inbound traffic to a given IVN, may be too high to handle the traffic of the entire IVN at a single partition; in such cases, the destinations of the IVN may be split across multiple partitions. In the scenario depicted in FIG. 4, the traffic of IVN 412A is handled by compute instance traffic partition 435A, while the traffic of IVNs 412B and 412C is handled by compute instance traffic partition 435B. The CPNs of the STSS may keep track of the number (and types) of CIs included in a given IVN, e.g., by subscribing to a notification system set up by the VCS control plane, and adjust partition-to-IVN mappings as needed in various embodiments.

In some embodiments the majority of the data plane partitions may be assigned to handle compute instance traffic, and this majority may be referred to as general-purpose partitions, with the remaining partitions being referred to as special-purpose partitions. In the scenario shown in FIG. 4, special purpose partitions include a load balancer traffic partition 436 (responsible for shaping traffic directed to multi-tenant load balancers of a load balancing service of the provider network at which the STSS is implemented) and a quarantine partition 438.

When the STSS control plane determines with a probability over a threshold that a given traffic destination is the target of a DDOS attack (or other similar attack), in some embodiments the responsibility for shaping the traffic of that target may be transferred to DPNs of a quarantine partition 438 from the original partition to which that traffic was assigned. By isolating DDOS attack targets in this way, the DPNs in the original partition may be relieved of handling traffic at very high rates themselves, and more stringent rate limiting actions may be taken in some embodiments at the quarantine partition 438 than would have been easily feasible at the original partition.

Figure 5:
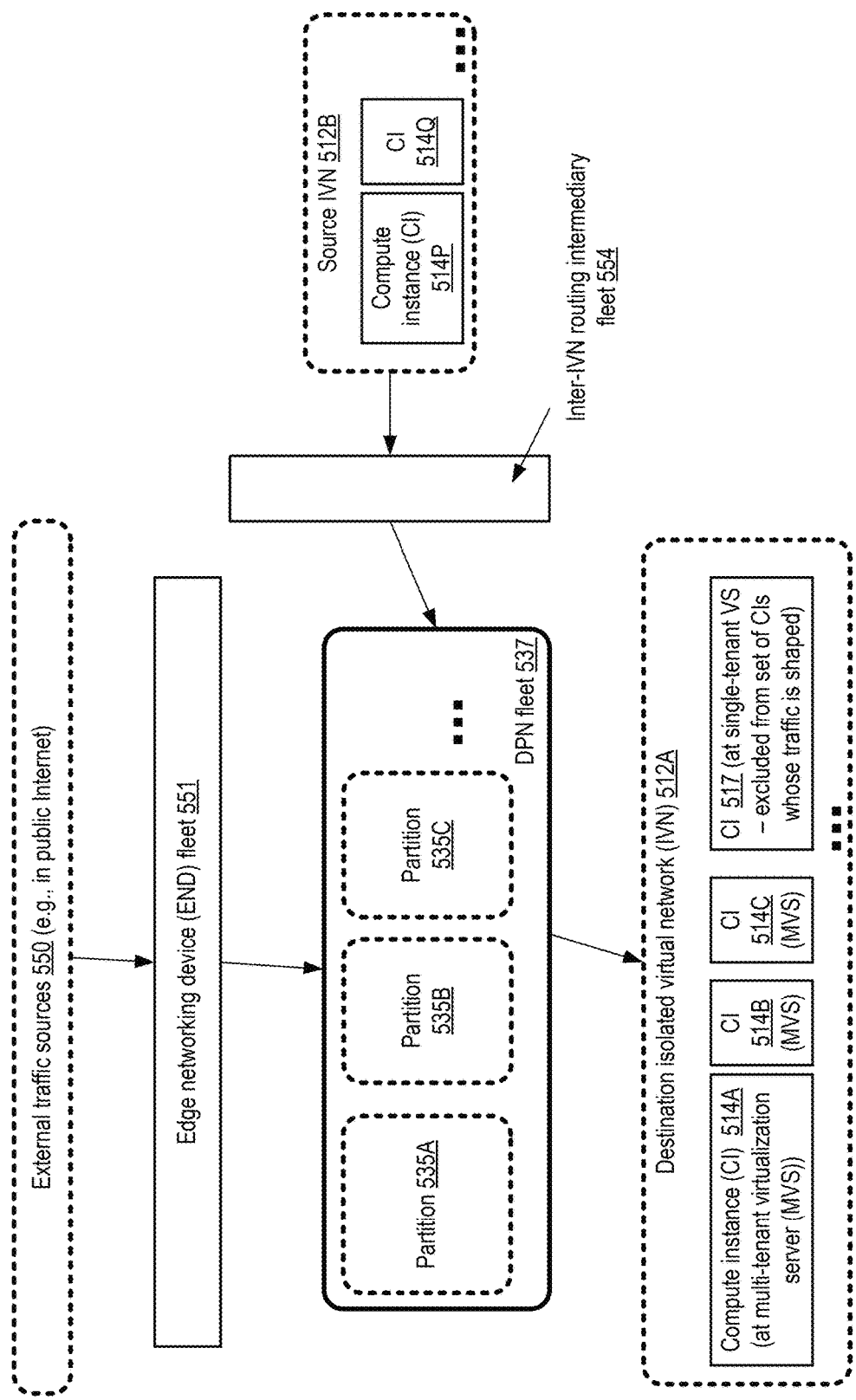
FIG. 5 illustrates an example scenario in which network traffic directed to an isolated virtual network of a cloud provider network from sources external to the cloud provider network as well as from sources within the cloud provider network may be processed by a traffic shaping service, according to at least some embodiments.

FIG. 5 illustrates an example scenario in which network traffic directed to an isolated virtual network of a cloud provider network from sources external to the cloud provider network as well as from sources within the cloud provider network may be processed by a traffic shaping service, according to at least some embodiments. In the embodiment shown in FIG. 5, traffic may be directed to the compute instances (CIs) 514 of a destination isolated virtual network (IVN) 512A from external traffic sources 550 (e.g., sources within the public Internet) and also from other IVNs of the VCS, such as source IVN 512B. A DPN fleet 537 comprising partitions 535A, 535B and 535C may process traffic directed to the destination IVN 512A in the depicted embodiment.

Information about the mappings between traffic destinations and the partitions 535 may be transmitted by CPNs of the STSS to at least two types of routing intermediaries in the depicted embodiment: edge networking device (END) fleet 551, as well as inter-IVN routing intermediary fleet 554. The inter-IVN routing intermediary fleet may for example include transit gateways or hubs, which can provide connectivity not only between IVNs but also between IVNs and client-owned premises external to the provider network in some embodiments.

In at least some embodiments, traffic directed to a selected subset of destinations such as compute instances or load balancers within a provider network may not be shaped by the STSS; for example, some CIs may be excluded from the set of destinations whose inbound traffic is analyzed for potential actionable overload conditions. In the embodiment shown in FIG. 5, the traffic directed to virtualized resources such as CIs that happen to run on single-tenant physical resources may not be shaped by the STSS. Within destination IVN 512A, CIs 514A, 514B and 514C may be run at multi-tenant virtualization servers (MVSs), while CI 517 may be run as the only CI at a single-tenant virtualization server. A single-tenant VS may have been selected for CI 517 for example, at the request of the provider network client on whose behalf the CI 517 was set up. The STSS control plane may identify destinations that are set up using single-tenant resources, and exclude such resources from the set of destinations whose traffic is analyzed for rate limiting purposes. The exclusion of such resources from the shaping actions of the STSS may be motivated, for example, by the fact that on a single-tenant device, noisy neighbor problems of the kind discussed in the context of FIG. 2 cannot occur. In other embodiments, traffic for all compute instances may be shaped by an STSS, regardless of whether the CIs are established using multi-tenant or single-tenant hardware.

Figure 6:
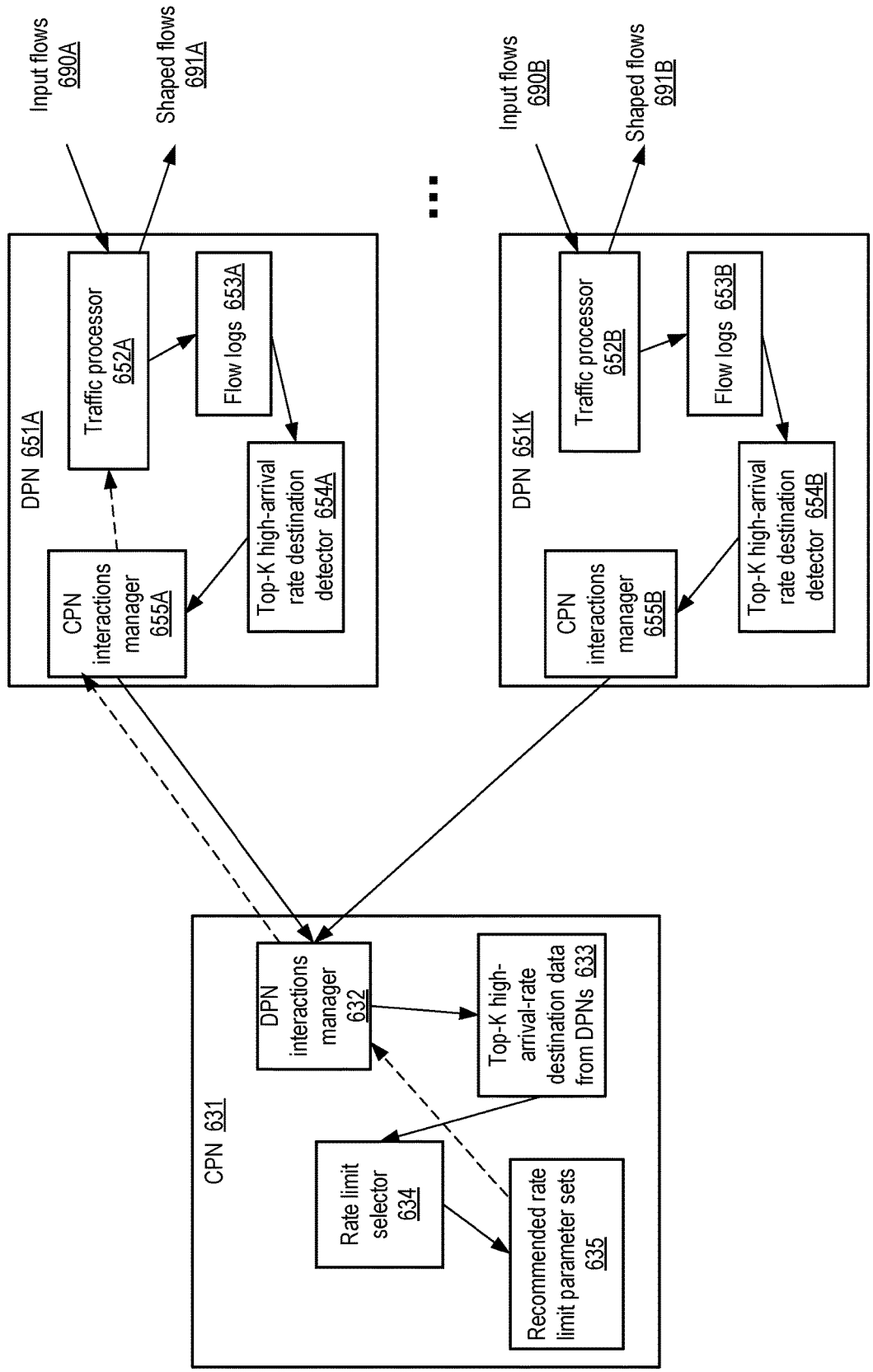
FIG. 6 illustrates example components of control plane nodes and data plane nodes of a traffic shaping service, according to at least some embodiments.

FIG. 6 illustrates example components of control plane nodes and data plane nodes of a traffic shaping service, according to at least some embodiments. In the depicted scenario, a CPN 631 of an STSS similar in features and functionality to STSS 125 of FIG. 1 communicates with at least two DPNs 651A and 651B, obtaining high-arrival-rate destination information from the DPNs and transmitting rate limit parameter sets as recommendations to the DPNs.

A given DPN 651 may include a traffic processor 652 (e.g., 652A or 652B), a set of local flow logs 653 (e.g., 653A or 653B), a top-K-high-arrival-rate destination selector 654 (e.g., 654A or 654B), and a CPN interactions manager 655 (e.g., 655A or 655B) in some embodiments. A CPN 631 may include a DPN interactions manager 632 a rate limit selector 634, a set of top-K-arrival rate destination data received from DPNs 633, and a set of recommended rate limit parameter sets 635 in various embodiments. Traffic processors, top-K-arrival-rate destination detectors, CPN interactions managers, DPN interactions managers, and/or rate limit selectors may be implemented as respective threads of execution or processes in at least some embodiments. The DPN and CPN components may interact with one another iteratively to dynamically generate, modify and apply rate limiting parameters in the depicted embodiment.

A traffic processor such as 652A may be responsible in some embodiments for receiving packets of various input flows 690A (e.g., from edge networking devices and/or from inter-IVN routing intermediaries), applying recommended rate limit parameter sets 635 sent from a CPN (if any rate limiting is required for a given input flow), sending the shaped flows 691A to their destination (e.g., after discarding some fraction of the packets in those cases in which rate limiting is to be applied), and adding entries to flow logs 653A representing the received and transmitted flows. Similarly, traffic processor 652B may take similar actions with respect to input flows 690B and shaped flows 691B. In some embodiments, the flow logs (or other storage objects) may also include indications of the particular flows to which rate limits are currently being applied.

A top-K high-arrival-rate destination selector such as 654A may examine the local flow logs 653A and identify the top K destinations, with respect to average arrival rate over a selected recent time interval, for which flows have been processed at the DPN in the depicted embodiment. A list or representation of the high-arrival-rate destinations may be provided to the local CPN interactions manager 655A. In some embodiments, information about the set of destinations for which rate limiting was enforced during the time interval may also be included in the high-arrival-rate destination data sent to the CPN interactions manager. The top-K arrival rate destinations may in some cases include one or more destinations for which rate limiting is currently being performed; in other cases, all the K destinations included in the top-K by arrival rate may be new, and rate limiting may not have been performed on their input flows.

The local CPN interactions manager such as 655A may send the information about the high-arrival-rate destinations and the current set of rate-limited destinations to the DPN interactions manager at one or more CPNs 631 in various embodiments. In some embodiments in which the STSS CPN fleet comprises multiple CPNs, each DPN may send its information to all the CPNs of the fleet; in other embodiments, a given DPN may send its information to a selected subset of the CPN fleet (in effect, the CPN fleet may also be partitioned in the latter case).

At the CPN, the top-K arrival rate destination data obtained 633 from one or more DPNs over one or more reporting cycles or iterations may be aggregated in some embodiments. A rate limit selector 634 may analyze the aggregated data, and based on the traffic management policies in use, decide whether any recommended rate limit parameter sets 635 should be propagated back to the DPNs. If one or more such recommended rate limit parameter sets are identified for the set of destinations being handled by a DPN, they may be transmitted from the CPN by the DPN interactions manager 632 to the appropriate CPN interactions manager(s) 655. In FIG. 6, the dashed line leading from the DPN interactions manager 632 to the CPN interactions manager 655A indicates that during a given iteration, a recommended rate limit parameter set is sent to DPN 651A. The absence of a similar dashed line from DPN interactions manager 632 to CPN interactions manager 655B indicates that no recommended rate limit parameter set is sent to DPN 651K during the same iteration. In some embodiments, the same recommended rate limit parameter set may be sent by a CPN to all the DPNs within a given partition. The same parameter may be set to all the DPNs of a partition, for example, in scenarios in which several different DPNs of the partition may process traffic for a given destination or a given rate limiting target. Note that in some embodiments, DPNs and/or CPNs may comprise components, or combinations of components, other than those shown in FIG. 6.

FIG. 7 illustrates examples of parameters governing the processing of network traffic at a traffic shaping service, according to at least some embodiments. At least some of the parameters shown in FIG. 7 may be tuned automatically in various embodiments, e.g., using machine learning or other analytics tools by control plane components of an STSS. In some embodiments, clients of a VCS and/or other services of a provider network may use programmatic interfaces of the STSS (such as command-line tools, web-based consoles, graphical user interfaces, application programming interfaces, etc.) to indicate preferred values of one or more of the parameters. Some of the parameter values used may differ based for example on the types of destinations being considered, the types of packets/messages whose rates are to be limited, and so on; as such, different values for a given parameter may be used in different parts of the STSS or for different STSS clients. Values of some of the parameters may be transmitted to the DPNs (and/or routing intermediaries such as edge networking devices) by CPNs in some embodiments, and updated as needed by the CPNs by transmitting additional messages. In one embodiment, updated parameter values may be transmitted by CPNs to DPNs in rate limiting commands that also indicate the specific rate limiting targets/candidates identified for a given iteration or time interval by the CPNs.

In various embodiments, a number of options (such as VCS compute instances of different instance families, which may differ in their compute capacities, memory capacities, networking capacities etc.) may be available to an STSS regarding the types of virtual or physical computing resources to be used as DPNs. The DPN compute capacities 702 selected may vary for different partitions, or even within a given partition in some embodiments.

The number and size range of data plane partitions 706, indicating the minimum and maximum permissible number of DPNs that can be included within partitions, and the number of partitions to be set up at least for a given set of destinations, may be selected for example by the CPNs in some embodiments.

Another key parameter may define the overload thresholds for triggering rate limiting 710 (e.g., exactly what constitutes an actionable network overload situation). Initial values may be selected at the STSS based on factors such as results of networking stress tests conducted on destination devices, and these initial values may be tuned over time in some embodiments (for example as new destination devices with greater networking and computing capacities are brought online). If and when an actionable overload scenario is detected, the numerical limits on packet flow rates 714 that are to be imposed by the DPNs may represent another STSS parameter.

In some embodiments, as mentioned earlier, the CPN fleet of an STSS may comprise numerous CPNs. DPN-to-CPN mappings parameters 718 may indicate the specific sets of DPNs with which a given CPN is to communicate (e.g., in the kinds of iterative interactions shown in FIG. 6), and/or the specific sets of CPNs with which a given DPN is to communicate iteratively. In various embodiments, the data regarding high-arrival-rate destinations that is provided by DPNs may be aggregated or smoothed, e.g., by computing running averages of the arrival rates over some time period or over some number of iterations in accordance with smoothing factors for detecting actionable overload conditions 722. As such, instead of using just one report of a series of reports of high-arrival-rate destinations from a given DPN, multiple such reports corresponding to respective points in time may be used for identifying rate limiting targets by the CPNs. Such smoothing may help to avoid situations in which the STSS overreacts to temporary or short-term surges in network packet arrival rates, for example.

If and when a decision is made that the rate at which packets of one or more flows are to be received at a destination is to be limited, a default duration for which flows are limited 726 may be indicated to the DPNs responsible for implementing the limits in some embodiments. Keeping the rates limited for some time may also avoid rapid transitions between rate limited periods of a packet flow and periods in which the flow is allowed to proceed without restrictions, which may also be beneficial if for example attackers vary their packet transmission rates.

In at least one embodiment, one or more special purpose data plane partitions may be configured as described earlier, including for example a quarantine partition whose DPNs are responsible for processing flows of DDOS attacks whose inbound traffic exceeds selected thresholds. For example, while DDOS attacks of up to N1 packets per second (or even somewhat over N1 packets per second) may be handled by general purpose partitions, destinations targeted by DDOS attacks with more than 10*N1 packets per second arriving may be transitioned over to a quarantine partition in accordance with quarantine criteria 730 in one embodiment. The quarantine partition DPNs may for example use more powerful computational resources and/or impose more stringent limits than the DPNs in general-purpose partitions in one embodiment. In some embodiments in which a quarantine partition is configured, in response to classifying a destination as a target of a network attack qualifying for quarantine, a CPN may transmit new destination-to-partition mappings to be sent to intermediaries such as ENDs, thereby causing processing of at least some subsequent packets directed to the attacked destination to be performed at the DPNs of the quarantine partition.

In some embodiments, raw packets/second (the total number of packets of any type) may be used as a metric to be analyzed for determining whether an actionable overload is occurring. In other embodiments, the rates of different classes of packets at various levels of the networking stack (e.g., raw packets, SYN packets, ICMP packets, HTTP packets, etc.) may be considered separately to detect actionable overloads, e.g., in accordance with a parameter referred to as flow categories to be shaped 734. A CPN may transmit an indication of the specific classes of packets/fragments whose arrival rates are to be used at the DPNs as the metrics for identifying high-arrival-rate destinations to be included in reports sent to the CPNs for potential rate limiting in some embodiments. In some cases, different classes of packets may be analyzed for respective sets of destinations —e.g., some destinations may not have a web server responding to HTTP requests, so HTTP packet arrival rates may not be used as the metric for such destinations. Multiple metrics may be analyzed for a given destination in some embodiments.

STSS data plane partitions themselves represent multi-tenant resources, which could (although such situations are likely to be very infrequent) be overwhelmed by the amount of incoming traffic. Partition overload handling policies 738 used in some embodiments may define the conditions under which a given data plane partition (which has already reached the maximum number of DPNs permitted) is to be considered as being overloaded, and the actions to be taken under such conditions. For example, some destinations being handled by an overloaded partition may be migrated/transitioned to other partitions including a quarantine partition, or the DPNs may be allowed to "fail fast" in some embodiments. In a fail fast scenario, a DPN may in effect allow packets of some flows to bypass the DPN, without requiring any other action by the DPN.

High-arrival-rate destination group data collection frequencies 742 indicate how frequently DPNs are to provide CPNs with the latest high-arrival-rate destination information available at the DPNs in the depicted embodiment. In some cases, the CPNs may pull the data from the DPNs, e.g., as part of regularly scheduled health status messages; in other embodiments, the DPNs may push the data to the CPNs.

In at least one embodiment, decisions regarding recommended rate limits may have to be agreed upon by several different CPNs before the recommendations are sent to one or more DPNs as part of a rate limiting parameter set. Any of a variety of CPN consensus algorithms 746 may be used in some embodiments—for example, one of the CPNs may be designated as a primary CPN for a given set of partitions and permitted to make the final decision based on input from multiple CPNs, or a voting algorithm may be used to determine whether a majority of CPNs agrees on a recommendation.

In some embodiments, a subset of destinations may be excluded, e.g., by the CPNs, from the set of similar destinations for which rate limiting techniques are being applied. Destination exclusion rules 750 may be used to identify such to-be-excluded destinations in some embodiments. For example, as discussed in the context of FIG. 5, in some embodiments, compute instances that are run at single-tenant virtualization servers may be excluded in according with such rules, while compute instances that are run at multi-tenant virtualization servers may be included. In various embodiments, other parameters than those shown in FIG. 7 may be used to manage traffic shaping choices.

Figure 8:
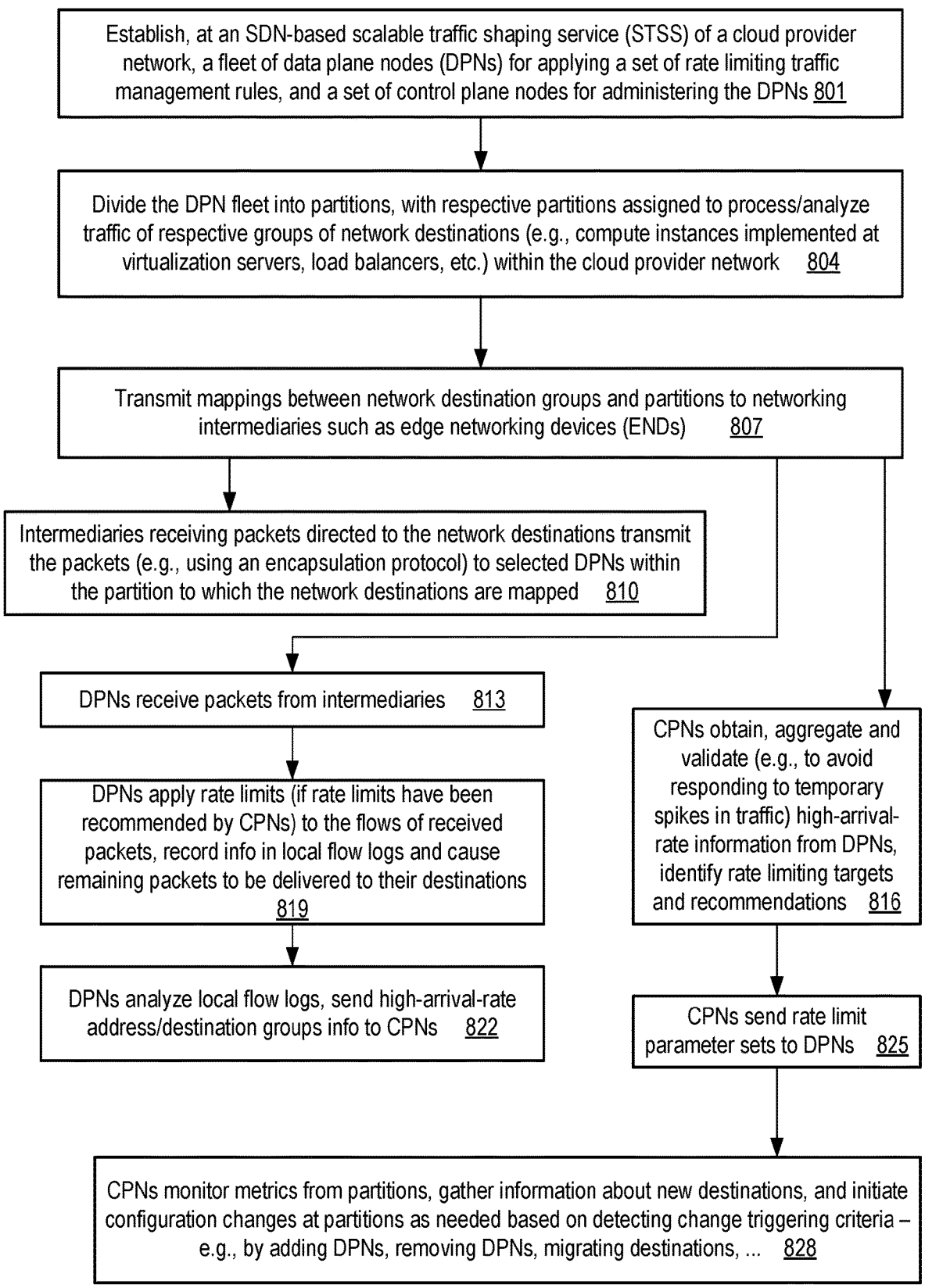
FIG. 8 is a flow diagram illustrating aspects of operations which may be performed to limit the rates of network traffic directed to a set of destinations, according to at least some embodiments.

FIG. 8 is a flow diagram illustrating aspects of operations which may be performed to limit the rates of network traffic directed to a set of destinations, according to at least some embodiments. As shown in element 801, a fleet of data plane nodes (DPNs) for applying a set of rate limiting traffic management rules with respect to a group of traffic destinations implemented at resources of a cloud provider network may be established or instantiated at a scalable traffic shaping service (STSS) of the cloud provider network. A set of control plane nodes (CPNs) of the STSS may also be established in various embodiments for administering the DPNs. In some implementations, DPNs and/or CPNs may be implemented at compute instances or virtual machines of a virtualized computing service (VCS) of the provider network; as such the STSS may be said to utilize software defined networking (SDN) techniques to perform at least a subset of its traffic shaping tasks. The STSS may also be referred to as a network function virtualization service; as such, the rate limiting operations performed at the STT may represent examples of virtualized network functions. In some embodiments, the traffic management rules may be generated by the CPNs, e.g., based on analysis of collected records of traffic directed to the destination resources over time, the networking capabilities of the destination resources, service level agreements of the destination resources with respect to networking, and so on. For example, the CPNs may compute the average rate A at which packets or packet subsets of a particular class or category (e.g., raw packets, partitions of raw packets, SYN packets, ICMP packets etc.) are delivered to a given destination resource R over a period of M months, and determine a traffic management rule which effectively states that if the corresponding packet rate directed to R exceeds K*A during a time interval of T minutes, the rate at which the packets are actually delivered to R should be limited to L*A (where L<K). In one embodiment, at least some traffic management rules may be provided via programmatic interfaces of the STSS (e.g., application programming interfaces, web-based consoles, command-line tools, graphical user interfaces and the like) by clients of the provider network.

The DPN fleet may be divided into partitions in various embodiments, with respective partitions assigned to process/analyze traffic of respective groups of network destinations within the cloud provider network (element 804). A network destination may comprise one or more resources (such as compute instances, load balancers etc.), with one or more network addresses assigned to individual ones of the resources in the depicted embodiment. In one embodiment, a destination may comprise a virtualization host at which several compute instances may be run, with respective network addresses assigned to each compute instance. In some embodiments, CPNs may be responsible for dividing the fleet, and for assigning a particular partition to a group of network destinations whose traffic is to be shaped by the STSS. In one embodiment, a given partition may initially be populated with enough DPNs to process up to a maximum aggregate inbound traffic rate selected by the CPNs, and new partitions may be created and populated with DPNs when the aggregate inbound traffic rate of the destinations assigned to each of the existing partitions exceeds the corresponding maximum. The number of DPNs in a given partition may differ from the number of DPNs in other partitions in at least some embodiments; as such, not all partitions may be identical in their traffic processing capacities. In one embodiment, the traffic processing capacities of different DPNs, either within a partition or across different partitions, may also vary—e.g., some DPNs may be implemented at compute instances with greater computing, memory and/or networking capacity than other DPNs. The number of destinations or addresses whose inbound traffic is to be processed by one partition may differ from the number of destinations or addresses whose inbound traffic is to be processed by a different partition.

Mappings between network destination groups and partitions may be transmitted (e.g., by the CPNs) to networking intermediaries of the provider network, such as edge networking devices (ENDs) or inter-IVN routing intermediaries in the depicted embodiment (element 807). Information about the set of DPNs includes in each of the partitions, including network addresses of the DPNs, and logic or algorithms to be used to select a given DPN to which packets received at the intermediaries should be transmitted from the intermediaries may also be provided to the intermediaries by the CPNs in various embodiments. The mappings and DPN selection information provided to the intermediaries may ensure that regardless of which particular intermediary receives a packet directed to a particular destination, that packet is sent to the same DPN for processing in the depicted embodiment.

The networking intermediaries may receive, from various packet sources (e.g., devices of the public Internet, or devices within the provider network), packets directed to destinations for which partitions have been assigned. The intermediaries may transmit such packets (e.g., using an encapsulation protocol in which the original packets are placed within the bodies of encapsulation packets, with the headers of the encapsulation packet indicating DPN addresses as destinations) to selected DPNs within the partitions to which the destinations are mapped (element 810). The destination-to-partition mappings, partition membership information, and within-partition DPM selection algorithms obtained from the CPNs may be used by the networking intermediaries to direct the packets to DPNs.

The DPNs may receive the packets from the intermediaries (element 813). The DPNs may apply rate limits to the flows of received packets if rate limits have been recommended by CPNs for the destinations of the packet flows (element 819). The DPNs may also record information about the received packets and rate limiting actions taken for the flows (e.g., which packets were discarded to apply the rate limits) in local flow logs in various embodiments. For flows to which rate limits are applied, a fraction of the packets may be discarded or dropped (based on rate limiting parameters specified by CPNs for the destinations of the packets), while the remaining packets may be transmitted to their destinations. In some implementations, a token bucket based algorithm may be employed by DPNs for rate limiting, in which a packet of a given flow is transmitted to its destination if and only if some number of tokens remain in a bucket assigned to the destination, and that number of tokens is deducted from the bucket if the packet is allowed to proceed to its destination. Various parameters of the token bucket based algorithm, such as the rate at which the token bucket is refilled for a given rate limiting target destination, may be determined by the CPNs. In one embodiment, such token bucket algorithms may be used for all the flows processed by DPNs, whether a given flow is being rate limited or not.

In addition to applying rate limits based on parameters provided by the CPNs, in various embodiments the DPNs may also provide data to the CPNs that is used by the CPNs to generate the recommended rate limits. For example, DPNs may iteratively analyze their respective local flow logs, identify high-arrival-rate destination groups based on metrics extracted from the flow logs with respect to received packets, and transmit the high-arrival-rate destination group information to one or more CPNs (element 822). In one embodiment, a given DPN may identify the K destinations which had the highest arrival rates of packets of a given category during the previous T seconds, and send that list of K destinations to one or more CPNs. The granularity at which the high arrival rate information is to be aggregated (e.g., whether each address assigned to a compute instance is considered a separate destination, or whether respective addresses of all compute instances run at the same virtualization server are to be considered as a destination) may be indicated by the CPNs to the DPNs in some embodiments. Similarly, the categories of packets (all packets, all packet fragments, SYN packets, ICMP packets, HTTP packets) for which high-arrival-rate information is to be provided by DPNs may be indicated by CPNs in at least one embodiment.

One or more CPNs may obtain, aggregate and validate high-arrival-rate information from one or more DPNs in view of applicable traffic management rules in the depicted embodiment (element 816) to identify rate limiting targets. In order to avoid imposing rate limits unnecessarily (e.g., in scenarios when an increase in arrival rate of packets to a destination happens to be only a temporary spike, which does not require imposition of rate limits), high-arrival-rate data sent over several iterations (with each iteration representing analysis of flow logs at a DPN over a different time interval) may be aggregated and analyzed together to identify/classify possible rate limiting candidates in some embodiments. In an embodiment in which respective high-arrival-rate destination group information is sent by a given DPN to several different CPNs, the CPNs may exchange messages with each other indicating respective sets of rate limiting targets identified at each CPN, and one or more destinations or addresses may be classified as targets based at least in part on the contents of the exchanged messages (e.g., so that rate limits are applied by consensus or based on voting by multiple CPNs). Based on the analysis performed at the CPNs, a set of rate limiting targets and corresponding recommendations on the actual rates to which inbound traffic to those targets should be limited may be determined. The CPNs may send rate limit parameter sets specifying the details of the recommendations (e.g., the targets and the rates) to the DPNs at which the rate limits are to be applied in various embodiments (element 825). In one embodiment, from among the sources from which traffic is being directed to a given rate limiting target, a CPN may be able to distinguish an attack source from a legitimate source (e.g., based on the respective rates of arriving traffic from the different sources). The recommendation details provided by the CDPN to a DPN may indicate that packets from the attacker source are to be dropped, while packets from the legitimate source are to be allowed to proceed as often as possible while still applying the recommended rate limit in such an embodiment. Thus, at least some fraction of packets from one source to a target destination may be dropped by a DPN when implementing rate limit, while one or more packets from a different source to the same destination may not be dropped in such scenarios.

The CPNs may monitor metrics from various partitions, including for example the resource utilization levels, traffic arrival rates, etc. in various embodiments. In addition, the CPNs may also be informed about new destinations (e.g., compute instances established at a VCS based on new requests from existing or new VCS clients) whose traffic is to be controlled or shaped, information about planned maintenance events (such as upgrades to software or hardware) at one or more partitions, etc. Triggering conditions or criteria for changing the configuration of one or more partitions may be detected based on such metrics and additional information, and the CPNs may initiate the appropriate changes dynamically in various embodiments (element 828). For example, DPNs may be added to a partition, removed from a partition, responsibility for processing a given destination's traffic may be migrated from one partition to another, and so on. In some embodiments, if an address or destination is identified (using the high-arrival-rate information provided by the DPNs) by a CPN as the target of a network attack such as a DDOS attack, the CPN may cause additional packets directed to that destination or address to be processed at a different partition (such as a quarantine partition) than the partition being used currently. It is noted that in various embodiments, some of the operations shown in the flow diagram of FIG. 8 may be implemented in a different order than that shown in the figure, or may be performed in parallel rather than sequentially. Additionally, some of the operations shown in FIG. 8 may not be required in one or more implementations.

Figure 9:
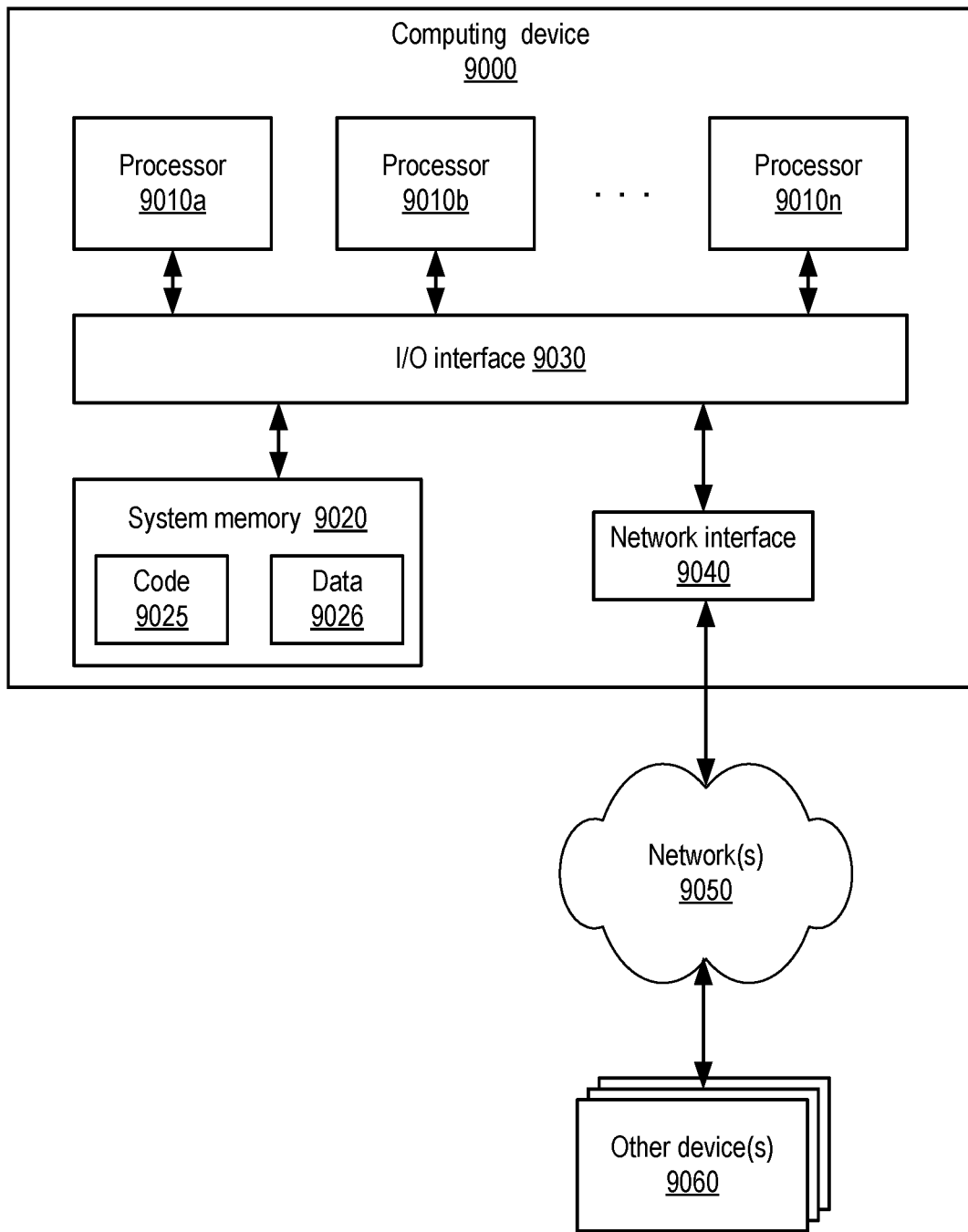
FIG. 9 is a block diagram illustrating an example computing device that may be used in at least some embodiments.

In at least some embodiments, a server that implements the types of techniques described herein (e.g., including functions of an STSS, VCS and/or other services of a cloud provider network) may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a control plane node of a traffic shaping service of a cloud provider network;

a fleet of data plane nodes of the traffic shaping service, divided into a plurality of partitions including a first partition; and an edge networking device of the cloud provider network;

wherein the edge networking device is configured to:
   cause one or more network packets to be transmitted to a particular data plane node of the first partition of the fleet of data plane nodes, wherein the one or more network packets are (a) received at the edge networking device from the public Internet and (b) have a destination network address within a set of destination network addresses to which the first partition has been assigned for traffic processing;

wherein the particular data plane node is configured to:
   apply, based at least in part on a parameter set provided by the control plane node, a limit on a rate at which network packets with a particular destination network address indicated as a rate limiting target in the parameter set are delivered to a compute instance to which the particular destination network address is assigned; and
   transmit, to the control plane node, an indication of a high-arrival-rate address group identified at the particular data plane node, wherein the high-arrival-rate address group is identified based at least in part on a metric of network packets received at the particular data plane node from a plurality of edge networking devices including the edge networking device; and wherein the control plane node is configured to:
   identify one or more destination network addresses of the set of destination network addresses as rate limiting targets based at least in part on (a) respective indications of high-arrival-rate address groups received at the control plane node from a plurality of data plane nodes including the particular data plane node and (b) a set of traffic management rules;
   transmit a parameter set to the particular data plane node, indicating the rate limiting targets; and
   dynamically modify membership of the first partition based on one or more criteria.

2. The system as recited in claim 1, wherein the control plane node is further configured to:
   transmit, to the particular data plane node, an indication of the metric to be used to identify high-arrival-rate address groups, wherein the metric comprises at least one of: (a) a raw packet arrival rate, (b) an arrival rate of SYN packets, (c) an arrival rate of ICMP (Internet Control Message Protocol) packets, or (d) an arrival rate of HTTP (HyperText Transfer Protocol) packets.

3. The system as recited in claim 1, wherein the control plane node is further configured to:
   in response to classifying, based at least in part on analysis of the respective indications of high-arrival-rate address groups received at the control plane node, another destination network address of the set of destination network addresses as a target of a network attack, cause processing of one or more additional packets directed to the other destination network address to be performed at a second partition of the plurality of partitions.

4. The system as recited in claim 1, wherein the control plane node is further configured to:
   obtain a series of indications of high-arrival-rate destination groups from the particular data plane node, wherein the series comprises (a) a first indication of a high-arrival-rate group identified at a first point in time and (b) a second indication of a high-arrival-rate group identified at a second point in time, wherein the respective indications of high-arrival-rate address groups used to identify the one or more destination network addresses of the set as rate limiting targets include the first indication and the second indication.

5. The system as recited in claim 1, wherein to apply the limit on the rate at which network packets with the particular destination network address indicated as a rate limiting target in the parameter set are delivered, the particular data plane node is further configured to drop, based at least in part on a number of tokens in a token bucket associated with the particular destination network address, a subset of packets directed to the particular destination address.

6. A computer-implemented method, comprising:
   causing one or more network packets, which are received at a routing intermediary of a provider network and are directed to a particular resource within the provider network, to be transmitted from the routing intermediary to a particular data plane node of a first partition of a plurality of data plane partitions of a traffic management service, wherein the first partition is assigned to process network packets directed to a first set of network addresses including a network address of the particular resource, and wherein the first partition comprises one or more data plane nodes including the particular data plane node;
   transmitting, from the particular data plane node to a first control plane node of the traffic management service, an indication of a high-arrival-rate address group identified at the particular data plane node, wherein the high-arrival-rate address group is identified based at least in part on a metric of network packets received at the particular data plane node from a plurality of routing intermediaries of the provider network including the routing intermediary;
   identifying, at the first control plane node, one or more network addresses as rate limiting targets based at least in part on (a) respective indications of high-arrival-rate address groups generated at a plurality of data plane nodes including the particular data plane node and (b) a set of traffic management rules;
   causing, by the first control plane node, the particular data plane node to apply a limit on a rate at which packets with a destination network address which was identified by the first control plane node as a rate limiting target are delivered to a corresponding resource within the provider network; and
   changing, by the first control plane node based on a scaling criterion, a number of data plane nodes included in the first partition.

7. The computer-implemented method as recited in claim 6, wherein the particular resource comprises one or more of: (a) a compute instance of a virtualized computing service or (b) a load balancer.

8. The computer-implemented method as recited in claim 6, wherein the particular resource is a virtual resource implemented at least in part at a multi-tenant hardware device, the computer-implemented method further comprising:
   including, based at least in part on determining that the virtual resource is implemented at a multi-tenant hardware device, the network address of the particular resource in a collection of network addresses whose packet arrival rates are to be analyzed to identify rate limiting targets.

9. The computer-implemented method as recited in claim 6, further comprising:

excluding another network address from a collection of network addresses whose packet arrival rates are to be analyzed to identify rate limiting targets, wherein said excluding is based at least in part on determining that the other network address is assigned to a virtual resource implemented at a single-tenant hardware device.

10. The computer-implemented method as recited in claim 6, further comprising:
assigning, by the first control plane node, the first partition to process network packets directed to the first set of network addresses; and
assigning, by the first control plane node, a second partition of the plurality of data plane partitions to process network packets directed to a second set of network addresses, wherein network packets with destination network addresses in the first set are transmitted from the plurality of routing intermediaries to data plane nodes of the first partition, wherein network packets with destination network addresses in the second set are transmitted from the plurality of routing intermediaries to data plane nodes of the second partition, and wherein network packets with destination network addresses in the first set are not transmitted from the plurality of routing intermediaries to data plane nodes of any other partition than the first partition.

11. The computer-implemented method as recited in claim 6, further comprising:
assigning, by the first control plane node, a first number of data plane nodes, and a first number of network addresses whose packets are to be processed, to the first partition; and
assigning, by the first control plane node, a second number of data plane nodes, and a second number of network addresses whose packets are to be processed, to a second partition of the plurality of data plane partitions.

12. The computer-implemented method as recited in claim 6, wherein the first set of network addresses comprises network addresses assigned within a particular isolated virtual network of a virtualized computing service of the provider network.

13. The computer-implemented method as recited in claim 6, wherein the traffic management service comprises a plurality of control plane nodes including the first control plane node and a second control plane node, wherein said identifying, at the first control plane node, one or more destination network addresses as rate limiting targets is based at least in part on one or more messages received at the first control plane node from the second control plane node.

14. The computer-implemented method as recited in claim 6, wherein said identifying, at the first control plane node, one or more destination network addresses as rate limiting targets is based at least in part on analysis of indications of a plurality of high-arrival-rate address groups received from the particular data plane node, including a first high-arrival-rate address group identified with respect to a first time interval, and a second high-arrival-rate address group identified with respect to a second time interval.

15. The computer-implemented method as recited in claim 6, further comprising:
in response to detecting, by the first control plane node after a first set of packets of a packet flow have been processed at the first partition, that a workload migration criterion for the first partition has been met, causing a second set of packets of the packet flow to be processed at a second partition of the plurality of data plane partitions.

16. A non-transitory computer-accessible storage medium storing program instructions that when executed on a processor:
cause one or more network packets, which are received at a first routing intermediary and are directed to a first resource, to be transmitted to a particular data plane node of a first partition of a plurality of data plane partitions of a traffic management service, wherein the first partition is assigned to process network packets directed to a first set of resources including the first resource, and wherein the first partition comprises one or more data plane nodes including the particular data plane node;
cause the particular data plane node to transmit, to a control plane node of the traffic management service, an indication of a high-arrival-rate destination group identified at the particular data plane node, wherein the high-arrival-rate destination group is identified based at least in part on a metric of network packets received at the particular data plane node from one or more routing intermediaries including the first routing intermediary;
identify, at the control plane node, one or more resources as rate limiting targets based at least in part on respective indications of high-arrival-rate destination groups received at the control plane node from a plurality of data plane nodes including the particular data plane node; and
cause, by the control plane node, a limit to be applied on a rate at which packets are delivered to a rate limiting target; and
change, by the control plane node based on detecting a triggering condition, a number of data plane nodes included in the first partition.

17. The non-transitory computer-accessible storage medium as recited in claim 16, wherein the particular data plane node comprises a compute instance of a virtualized computing service.

18. The non-transitory computer-accessible storage medium as recited in claim 16, storing further program instructions that when executed on the processor:
to cause the limit to be applied, (a) cause a first packet to be dropped based at least in part on determining that the first packet is from a first source, and (b) cause a second packet not to be dropped based at least in part on determining that the second packet is from a second source.

19. The non-transitory computer-accessible storage medium as recited in claim 16, wherein the first set of resources includes a second resource, and wherein the non-transitory computer-accessible storage medium stores further program instructions that when executed on the processor:
cause one or more network packets, which are received at the first routing intermediary and are directed to the second resource, to be transmitted to another data plane node of the first partition.

20. The non-transitory computer-accessible storage medium as recited in claim 16, storing further program instructions that when executed on the processor:
cause one or more network packets, which are received at a second routing intermediary and are directed to the first resource, to be transmitted to the particular data plane node of the first partition.

* * * * *